United States Patent
Mido et al.

(10) Patent No.: US 6,917,514 B2
(45) Date of Patent: Jul. 12, 2005

(54) ELECTROLYTIC CAPACITOR AND METHOD FOR MANUFACTURING THE SAME

(75) Inventors: Yuji Mido, Osaka (JP); Tatsuo Fujii, Osaka (JP); Katsumasa Miki, Osaka (JP); Suzushi Kimura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 190 days.

(21) Appl. No.: 10/618,595

(22) Filed: Jul. 15, 2003

(65) Prior Publication Data

US 2005/0047062 A1 Mar. 3, 2005

(30) Foreign Application Priority Data

Jul. 19, 2002 (JP) ......................................... 2002-210746

(51) Int. Cl.[7] .......................... H01G 4/228; H01G 9/04; H01G 9/00
(52) U.S. Cl. ...................... 361/533; 361/540; 361/538; 29/25.03
(58) Field of Search .......................... 361/523, 328–529, 361/532–534, 538–540; 29/25.03

(56) References Cited

U.S. PATENT DOCUMENTS

| | | | | |
|---|---|---|---|---|
| 6,510,045 B2 | * | 1/2003 | Mido et al. | 361/529 |
| 6,775,126 B2 | * | 8/2004 | Fujii et al. | 361/523 |
| 6,785,147 B2 | * | 8/2004 | Miki et al. | 361/760 |
| 6,822,849 B2 | * | 11/2004 | Miki et al. | 361/523 |
| 6,852,137 B2 | * | 2/2005 | Miki et al. | 29/25.03 |
| 6,855,177 B2 | * | 2/2005 | Fujii et al. | 29/25.03 |

* cited by examiner

*Primary Examiner*—Eric W. Thomas
(74) *Attorney, Agent, or Firm*—Wenderoth, Lind & Ponack, L.L.P.

(57) ABSTRACT

A solid electrolytic capacitor includes a valve metal sheet having a porous portion on one side of the sheet, a dielectric layer formed on the porous portion, a solid electrolyte layer formed on the dielectric layer, a collector layer formed on the solid electrolyte layer, a through-hole electrode connected to the collector layer and penetrating the valve metal sheet to be exposed to the other side of the sheet, and an electrode terminal insulated from the through-hole electrode and connected to the valve metal sheet. The capacitor further includes an insulating portion penetrating the valve metal sheet and a penetration electrode penetrating the insulating portion. The solid electrolytic capacitor has a large capacitance and an excellent radio frequency response, and can be easily mounted on a semiconductor device.

51 Claims, 20 Drawing Sheets

ELECTROLYTIC CAPACITOR AND METHOD FOR MANUFACTURING THE SAME

FIELD OF THE INVENTION

The present invention relates to a solid electrolytic capacitor used in various electronic appliances and a method of manufacturing the capacitor.

BACKGROUND OF THE INVENTION

A conventional solid electrolytic capacitor includes capacitor elements. Each capacitor element includes an electrode portion which is a core at one side or a center in the thickness direction of a porous valve metal sheet, such as aluminum or tantalum, a dielectric layer formed on a porous surface of the valve metal sheet, a solid electrolyte layer made of e.g. functional high polymer, provided on the dielectric layer, a collector layer provided on solid electrolyte layer, and an electrode layer of metal on the collector layer. The solid electrolytic capacitor elements are stacked. Respective electrode portions of the solid electrolytic capacitor elements are connected to an external terminal, and respective electrode layers of the capacitor elements are connected to another external terminal. A package is provided so that the external terminals may be exposed outside of the package.

The conventional solid electrolytic capacitor can have a large capacitance and a small equivalent series resistance (ESR), but must be mounted on a circuit board through the external terminals similarly to a general solid electrolytic capacitor.

The solid electrolytic capacitor mounted on a circuit board like a semiconductor device has a large ESR and a large equivalent series inductance (ESL) due to lengths of the terminals or wires, thus having an inferior radio frequency response.

To solve such problems, a solid electrolytic capacitor capable having a small ESR and ESL is proposed. Both positive and negative electrodes are disposed on one side of the solid electrolytic capacitor, and electronic components are directly mounted on the solid electrolytic capacitor.

SUMMARY OF THE INVENTION

A solid electrolytic capacitor includes a valve metal sheet having a porous portion at a first side of the sheet, a dielectric layer formed on the porous portion, a solid electrolyte layer formed on the dielectric layer, a collector layer formed on the solid electrolyte layer, a through-hole electrode penetrating the valve metal sheet and being exposed to a direction of a second side of the valve metal sheet, wherein the through-hole electrode is connected to the collector layer and insulated from the valve metal sheet, an electrode terminal exposed to the direction of the second side of the valve metal sheet, wherein the electrode terminal is insulated from the through-hole electrode and connected to the valve metal sheet, an insulating portion penetrating a portion of the valve metal sheet where the dielectric layer, the solid electrolyte layer, and the collector layer are not provided, and a penetration electrode penetrating the insulating portion.

The solid electrolytic capacitor can be directly connected with a semiconductor device, and has an excellent radio frequency response, a large capacitance, and a high reliability.

DESCRIPTION OF THE PREFERRED EMBODIMENTS (Embodiment 1)

Figure 1:
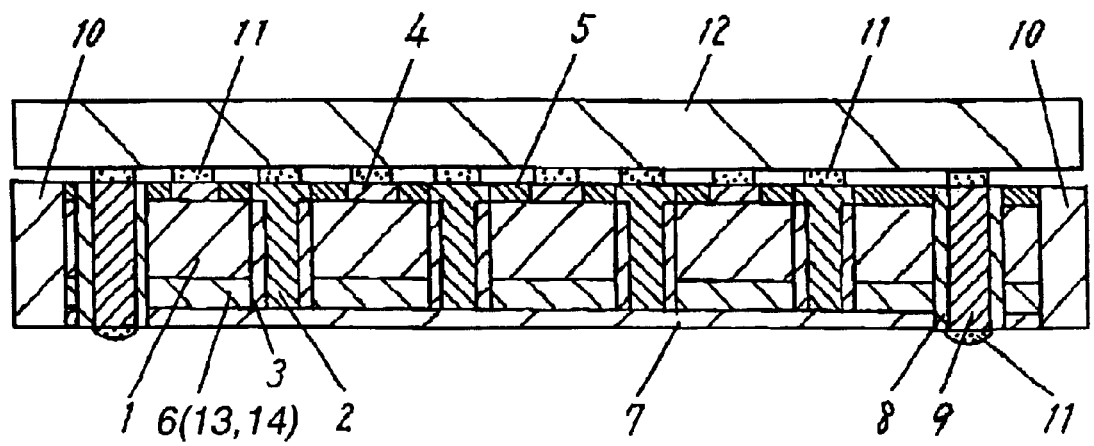
FIG. 1 is a sectional view of a solid electrolytic capacitor according to exemplary embodiment 1 of the present invention.
Figure 2:
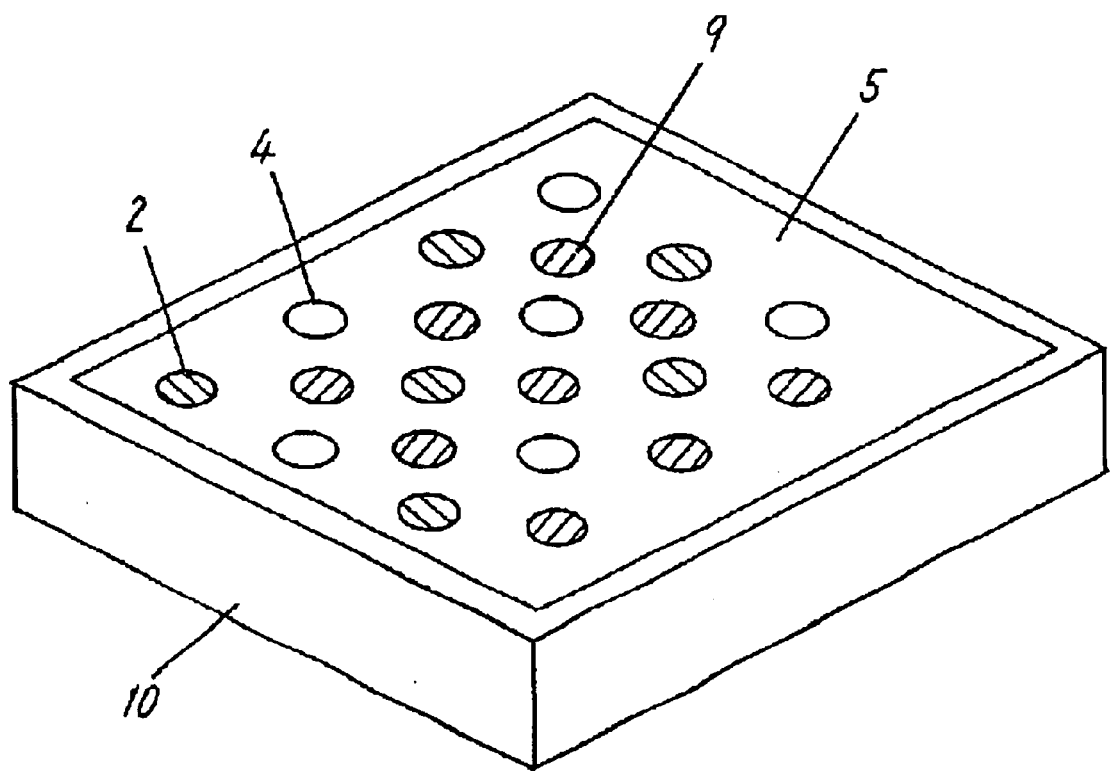
FIG. 2 is a perspective view of the solid electrolytic capacitor of embodiment 1.
Figure 3:
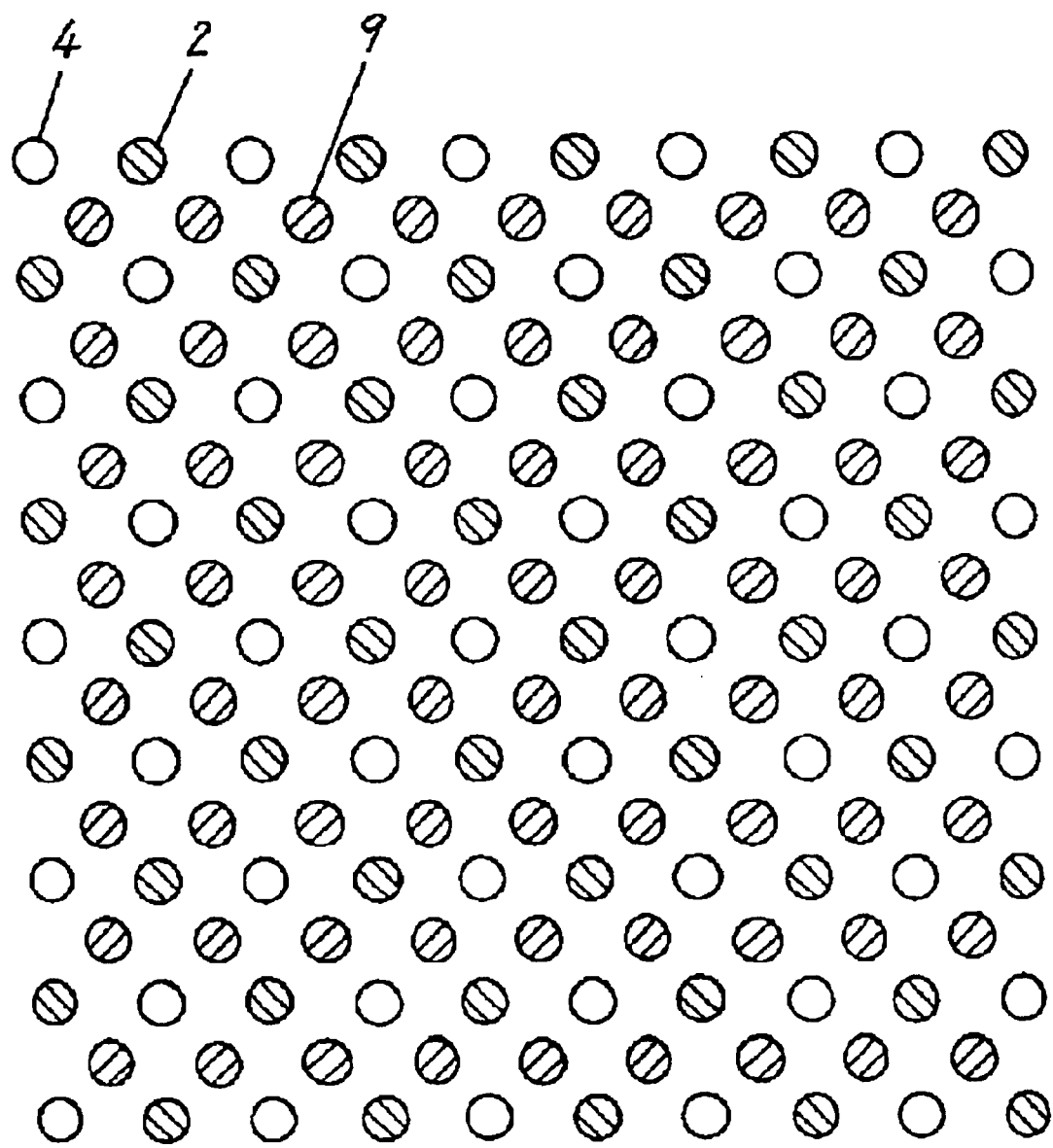
FIG. 3 is a plan view showing a layout of electrodes of the solid electrolytic capacitor of embodiment 1.
Figure 4:
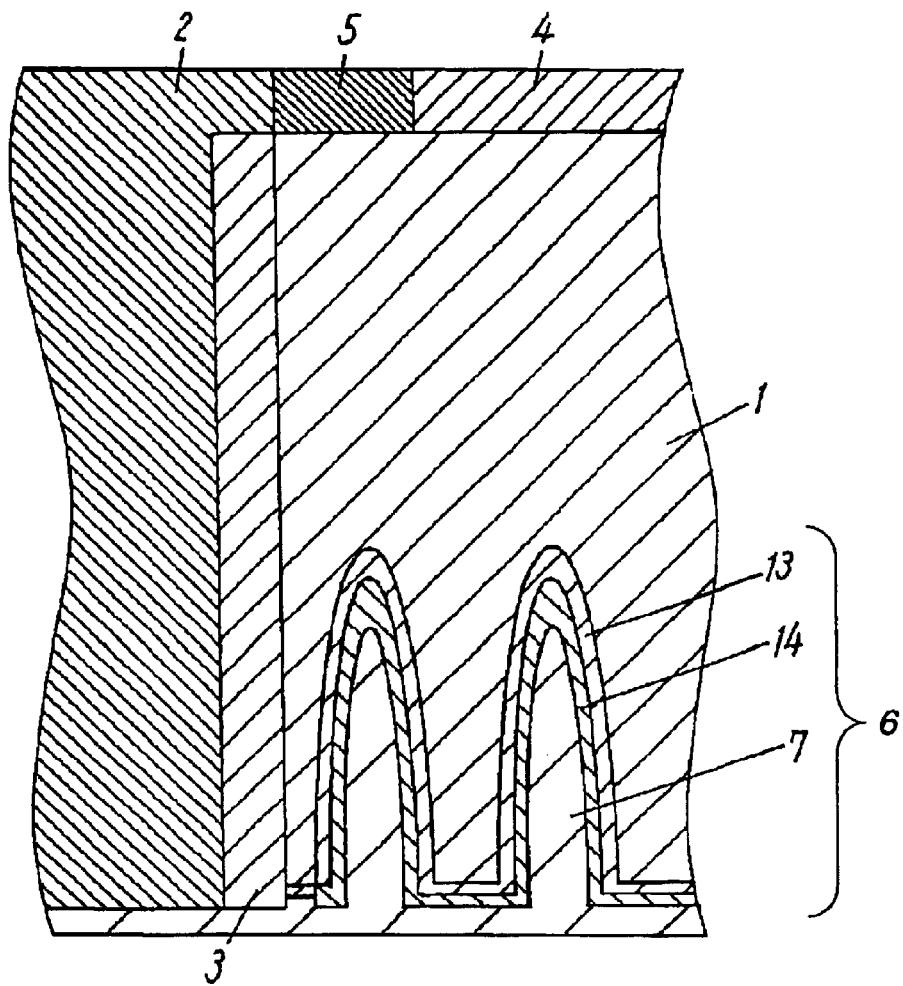
FIG. 4 is an enlarged sectional view of an essential portion of the solid electrolytic capacitor of embodiment 1.

FIG. 1 is a sectional view of a solid electrolytic capacitor according to exemplary embodiment 1 of the invention. FIG. 2 is a perspective view of the capacitor. FIG. 3 is a plan view showing a layout of electrodes of the capacitor. FIG. 4 is an enlarged sectional view of an essential portion of the capacitor. A valve metal sheet 1 of made of one of Al, Ta, and Nb has its one side etched by acid or the like to have a porous portion 6 having multiple fine pores on the surface. The surface of the porous portion 6 is anodized to provide a dielectric layer 13. A solid electrolyte layer 14 is formed on the dielectric layer 13, thus providing a capacitance of the solid electrolytic capacitor.

Alternatively, powder of tantalum, niobium or the like may be sintered on one side of the valve metal sheet 1 to provide a porous sintered layer. The dielectric layer 13 is formed on the sintered layer. The solid electrolyte layer 14 of conductive polymer is formed on the dielectric layer 13.

Such material allows the porous portion 6 to be formed easily. Oxide of the material has a relatively high dielectric constant, thus being preferable for the solid electrolytic capacitor.

The solid electrolyte layer 14 is made of functional polymer, such as polypyrrole or polythiophene, formed by chemical polymerization or electrolytic polymerization, or may be made of manganese dioxide formed by pyrolysis by impregnating manganese nitrate solution. As a result, an area of the portion of the valve metal sheet 1 functioning as a solid electrolytic capacitor is expanded by the porous portion 6. Further, the porous portion 6 is filled with conductive polymer material to provide a large capacitance.

A collector layer 7 made of conductor, such as carbon or silver paste, is provided on the solid electrolyte layer 14, thus allowing an electrode to be easily drawn out to one side of the capacitor.

Then, a through-hole electrode 2 penetrating the valve metal sheet 1 is provided to draw out the electrode to the other side of the valve metal sheet 1 through the collector layer 7. The through-hole electrode 2 and the valve metal sheet 1 are electrically insulated from each other by an insulating layer 3.

An electrode terminal 4, the other electrode, is electrically connected to the valve metal sheet 1.

A penetration electrode 9 penetrating the solid electrolytic capacitor electrically insulated from the solid electrolytic capacitor by an insulating portion 8 is provided. A protective layer 5 is provided on the other side of the valve metal sheet 1 for providing insulation and enhancing the reliability. An outer side surface of the valve metal sheet 1 is covered with a package 10 for enhancing an electrical insulation and mechanical strength of the capacitor.

In FIG. 1, the package 10 is formed only on the outer side surface of the valve metal sheet 1 in order to expose the electrodes to both sides of the capacitor. In the case that the electrode is not connected from one side of the collector layer 7, the package 10 may be provided on the one side of the capacitor, thus allowing the capacitor to be used as a surface mount device to be mounted on a circuit board. Thus, a position of the package 10 may be modified easily depending on an application.

Bumps 11 may be formed on respective exposed portions of the through-hole electrode 2, electrode terminal 4, and penetration electrode 9, and easily bonded to the semiconductor device 12, hence allowing the capacitor to be applicable to high density mounting.

As shown in FIG. 2 and FIG. 3, in the solid electrolytic capacitor of embodiment 1, the through-hole electrodes 2 and the electrode terminals 4 are arranged in a matrix adjacent to each other in parallel and alternately. The penetration electrodes 9 are located in the middle of the through-hole electrodes 2 and electrode terminals 4 adjacent to each other. The layout of the electrodes may be determined according to the number of terminals and a pitch of the terminals of the semiconductor device 12 to be bonded to the capacitor.

FIG. 5 to FIG. 16 are sectional views for showing a method of manufacturing the solid electrolytic capacitor.

Figure 5:
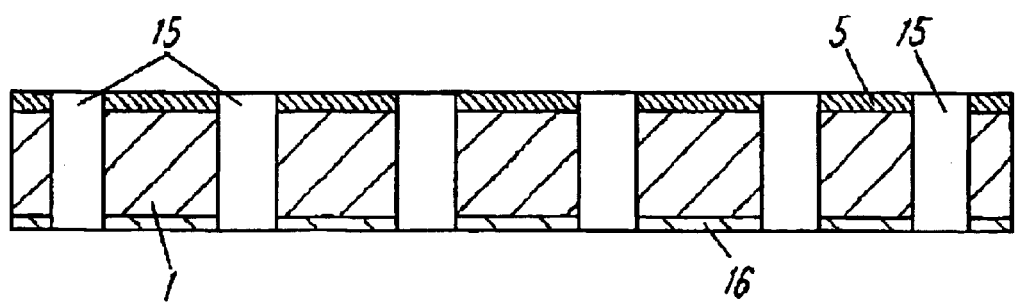
FIG. 5 is a sectional view of the solid electrolytic capacitor of embodiment 1.

First, as shown in FIG. 5, a resist 16 is applied on one side of the valve metal sheet 1 made of aluminum, a protective layer 5 is applied on the other side of the sheet, and penetration holes 15 are formed by laser processing or punch processing.

Figure 6:
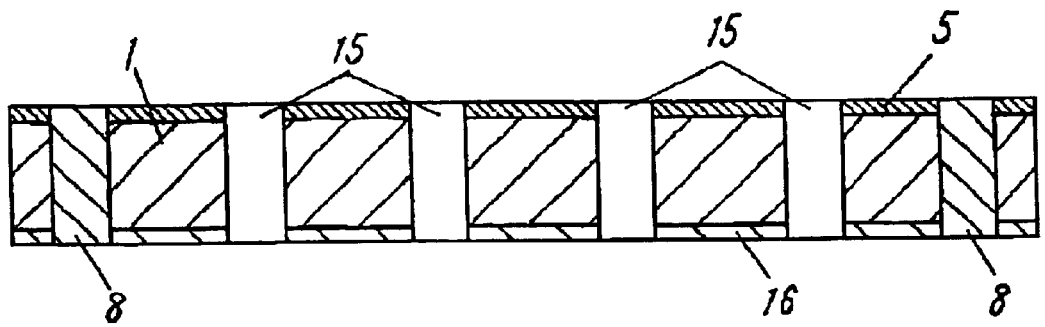
FIG. 6 is a sectional view of the solid electrolytic capacitor of embodiment 1.

Next, as shown in FIG. 6, organic insulating resin is injected into the penetration holes 15 to be the penetration electrodes 9 with a dispenser or other method, thus providing insulating portions 8.

Figure 7:
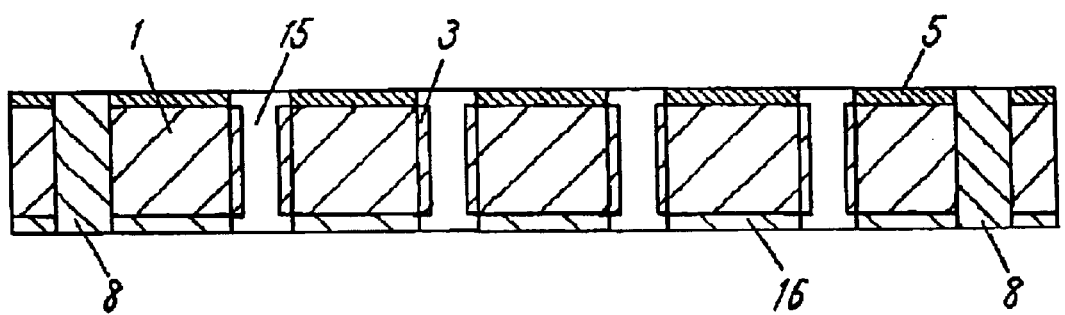
FIG. 7 is a sectional view of the solid electrolytic capacitor of embodiment 1.

As shown in FIG. 7, insulating resin is adhered by electro-deposition onto inner walls of the penetration holes 15 on which the valve metal sheet 1 is exposed, thus providing insulating layers 3. At this moment, the insulating resin is provisionally cured at a temperature for the resist 16 to be taken off before the insulating resin of the insulating layer 3 after the electro-deposition is cured.

Figure 8:
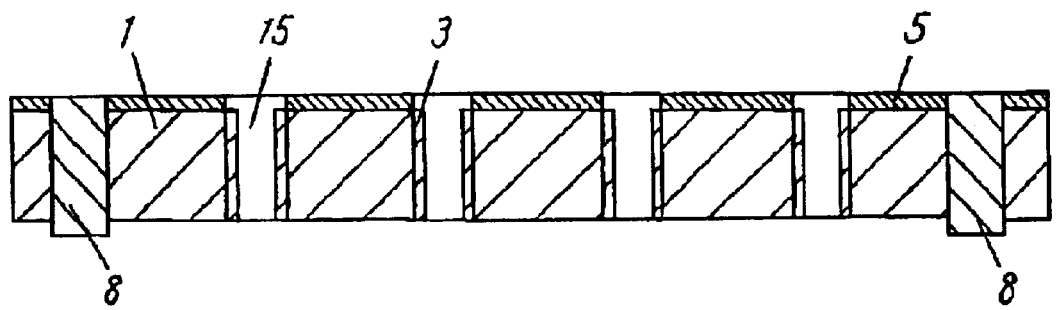
FIG. 8 is a sectional view of the solid electrolytic capacitor of embodiment 1.
Figure 9:
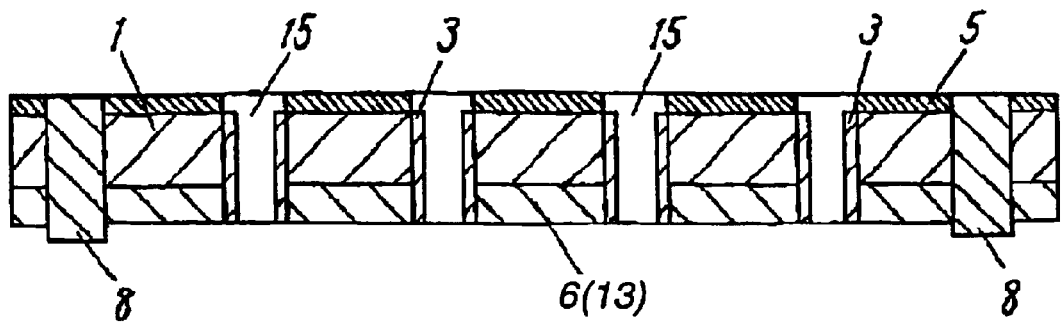
FIG. 9 is a sectional view of the solid electrolytic capacitor of embodiment 1.
Figure 10:
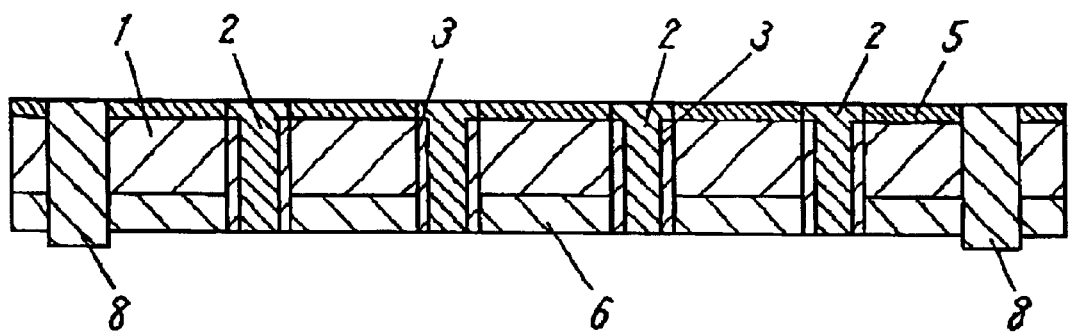
FIG. 10 is a sectional view of the solid electrolytic capacitor of embodiment 1.

Then, as shown in FIG. 8, the resist 16 is removed by immersing it in solvent, the insulating layer 3 is cured at a predetermined curing temperature. Next, as shown in FIG. 9, one side of the valve metal sheet 1 is etched by acid or the like to form the porous portion 6 on the side. The dielectric layer 13 is formed on the porous portion 6. Further, as shown in FIG. 10, the inside of the penetration holes 15 is filled with conductive paste by printing, dispenser or other method to form the through-hole electrodes 2. The through-hole electrodes 2 are formed by plating, thus having a small equivalent series resistance (ESR).

Figure 11:
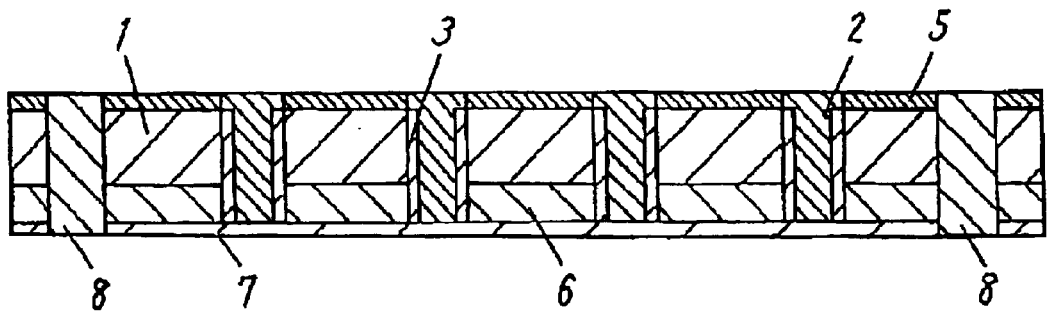
FIG. 11 is a sectional view of the solid electrolytic capacitor of embodiment 1.

As shown in FIG. 11, a solid electrolyte layer 14 is formed on the dielectric layer 13 and on one side of the through-hole electrode 2, and a collector layer 7 of carbon paste or Ag paste is formed on the solid electrolyte layer 14.

The solid electrolyte layer 14 may be formed by polymerization method. That is, after nucleating polythiophene on a surface of the porous portion 6 by chemical polymerization method, a layer of polythiophene, conductive polymer, is formed by electrolytic polymerization. This method enables the capacitance of the solid electrolytic capacitor to be taken out efficiently since the negative electrode can be formed in a deep portion of the porous portion 6. The through-hole electrodes 2 and the collector layer 7 may be connected directly with Ag paste or the like without resort to the solid electrolyte layer 14, thus allowing the electrodes to be drawn out with a small lower resistance.

Figure 12:
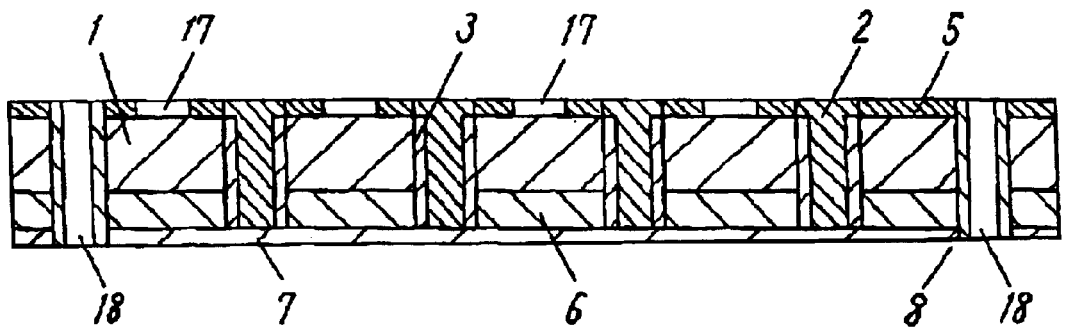
FIG. 12 is a sectional view of the solid electrolytic capacitor of embodiment 1.

Then, as shown in FIG. 12, portions of the protective layer 5 for forming the electrode terminals 4 and portions of the insulating layer 8 for composing the penetration electrodes 9 are removed by laser processing method or the like to form openings 17 and penetration portions 18.

Figure 13:
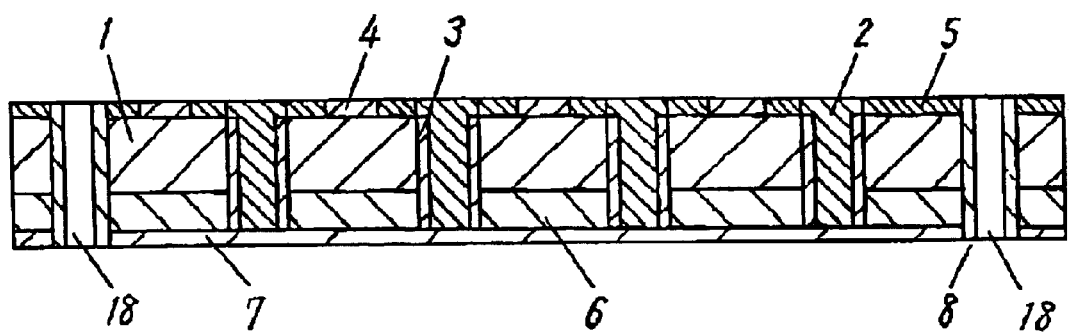
FIG. 13 is a sectional view of the solid electrolytic capacitor of embodiment 1.
Figure 14:
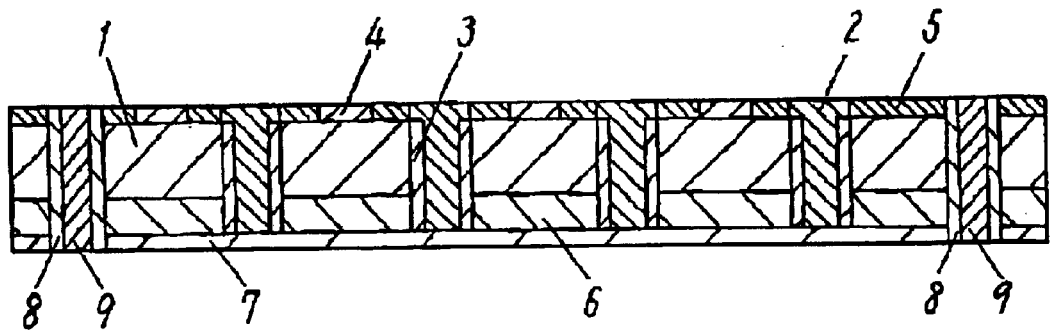
FIG. 14 is a sectional view of the solid electrolytic capacitor of embodiment 1.

As shown in FIG. 13, electrode terminals 4 are formed on an aluminum surface exposed through the openings 17 by nickel plating, Cu plating or gold plating. Then, as shown in FIG. 14, a surface of the insulating layer 8 in the penetration portions 18 is nucleated for plating process, and the penetration electrodes 9 are then formed by copper or silver plating.

Figure 15:
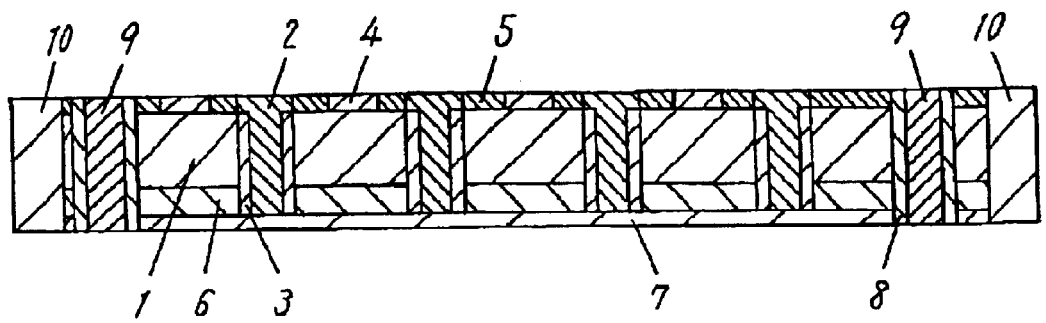
FIG. 15 is a sectional view of the solid electrolytic capacitor of embodiment 1.
Figure 16:
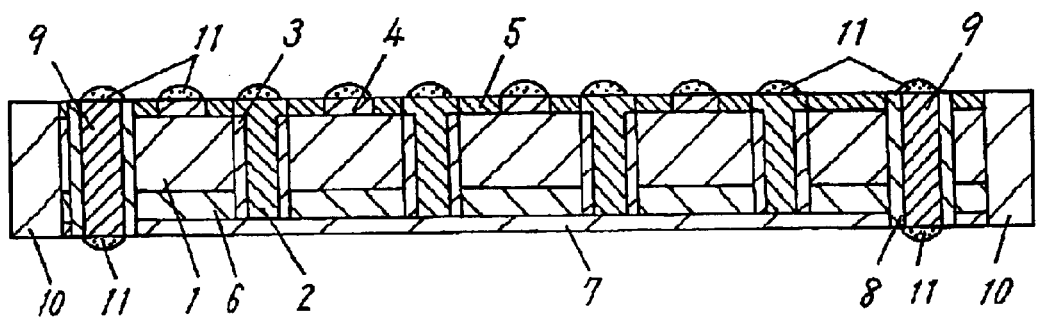
FIG. 16 is a sectional view of the solid electrolytic capacitor of embodiment 1.

Then, as shown in FIG. 15, the outer side surface of the valve metal sheet 1 is covered with insulating material, such as resin, to form the package 10. Then, as shown in FIG. 16, connection bumps 11 of solder, gold, tin, silver or the like are formed on the exposed surfaces of the through-hole electrodes 2, the electrode terminals 4, and the penetration electrodes 9, thus providing the solid electrolytic capacitor.

FIG. 1 shows the solid electrolytic capacitor having the semiconductor device 12 mounted on the capacitor. The bumps 11 provided on the exposed surfaces of the through-hole electrodes 2, electrode terminals 4, and penetration electrodes 9 are aligned with the terminals of the semiconductor device 12 and directly mounted.

The semiconductor device 12 can be directly mounted on this solid electrolytic capacitor. Since a wiring pattern for connecting the device to the capacitor is not required, problems in the radio frequency range, such as the ESR and an equivalent series inductance (ESL) can be decreased, and the solid electrolytic capacitor applicable to the semiconductor device 12 operating at a high speed. For example, this solid electrolytic capacitor includes the penetration electrode 9 which is not connected to a capacitor having a capacitance. Therefore, the solid electrolytic capacitor of embodiment 1 mounted on a circuit board includes, inside of the solid electrolytic capacitor, the electrode terminals for connecting signal lines directly to the semiconductor device 12 without resort to a capacitor. The terminals reduce an area for mounting the capacitor, and reduces a length of a signal line connected to the semiconductor device 12.

Further, the manufacturing method of embodiment 1 provides solid electrolytic capacitors applicable to the semiconductor devices 12 having various numbers of terminals and various pitches of the terminals.

(Embodiment 2)

Figure 17:
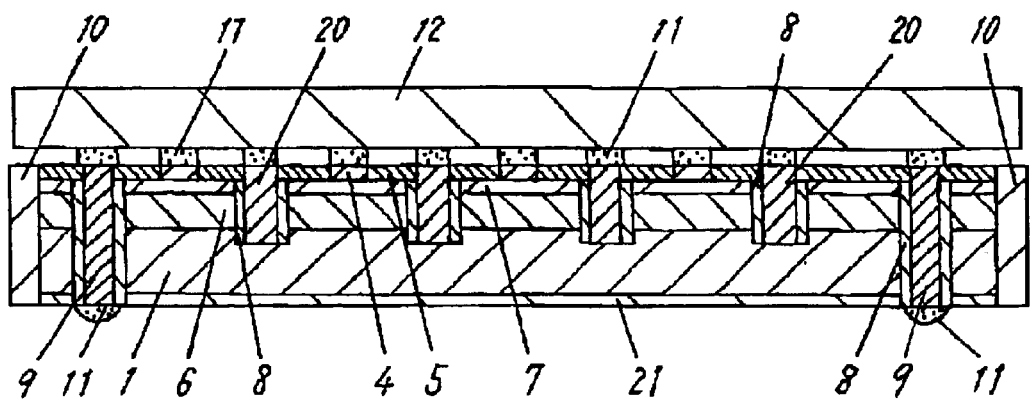
FIG. 17 is a sectional view of a solid electrolytic capacitor according to exemplary embodiment 2 of the invention.

FIG. 17 is a sectional view of a solid electrolytic capacitor according to exemplary embodiment 2 of the invention. A capacitor having a capacitance itself is identical to that of embodiment 1. In the capacitor of embodiment 2, differently from a solid electrolytic capacitor of embodiment 1, a via-electrode 20 penetrating a porous portion 6 provided at one side of a valve metal sheet 1 is coupled with a semiconductor device 12 with a bump 11 at a side of the porous portion 6 of the valve metal sheet 1.

The solid electrolytic capacitor of embodiment 2 will be explained with referring to FIG. 18 to FIG. 26.

Figure 18:
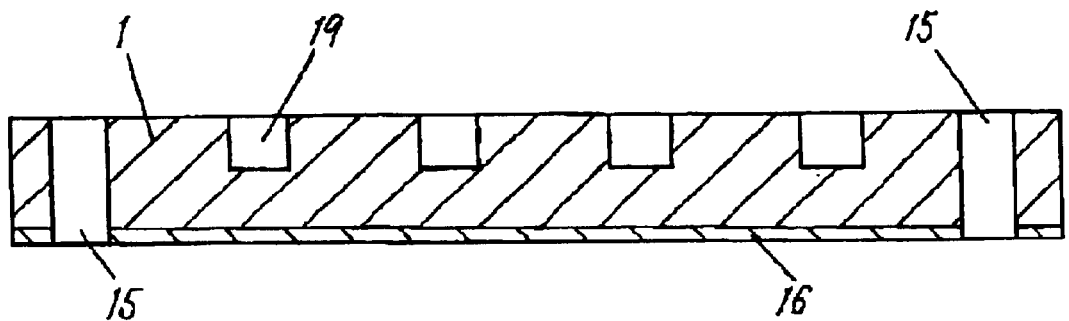
FIG. 18 is a sectional view of the solid electrolytic capacitor of embodiment 2.

As shown in FIG. 18, a resist 16 is applied on the other side of the valve metal sheet 1 of aluminum, and penetration holes 15 and blind holes 19 having bottoms are formed in one side of the valve metal sheet 1 by laser processing, etching, or other method.

Figure 19:
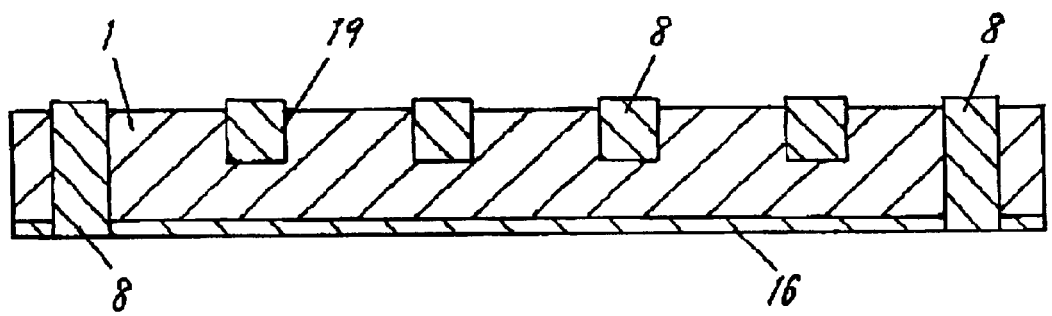
FIG. 19 is a sectional view of the solid electrolytic capacitor of embodiment 2.
Figure 20:
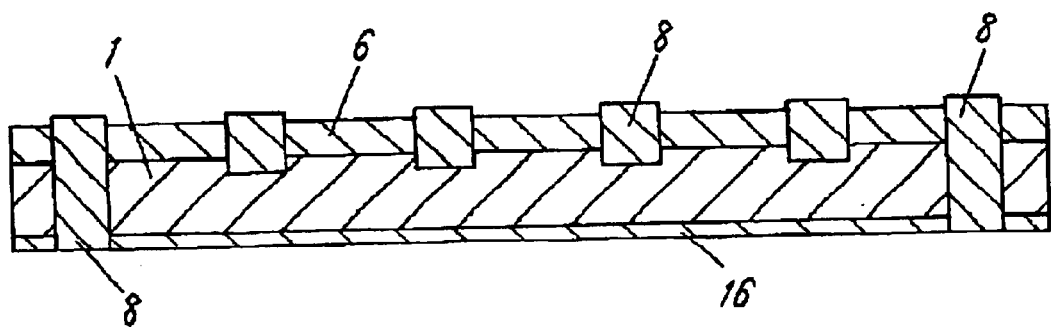
FIG. 20 is a sectional view of the solid electrolytic capacitor of embodiment 2.

As shown in FIG. 19, insulating portions 8 are formed inside of the blind holes 19 and penetration holes 15. Then, similarly to embodiment 1, a porous portion 6 is formed on one side of the valve metal sheet 1, as shown in FIG. 20, and a dielectric layer 13 is then formed on the surface of the porous portion 6. In FIG. 19, the insulating portions 8 project from the surface of the valve metal sheet 1. A projecting portion of the portions 8 is higher than a collector layer 7 formed at a later process.

Then, similarly to embodiment 1, a solid electrolyte layer 14 is formed on the dielectric layer 13. If the valve metal sheet 1 is made of tantalum or niobium, powder of tantalum or niobium is first applied, and is then baked to form a porous portion 6. Then, a resist 16 is applied. The blind holes 19 and the penetration holes 15 are formed, and the insulating portions 8 are formed in the blind holes 19 and penetration holes 15, thus providing a structure shown in FIG. 20.

Figure 21:
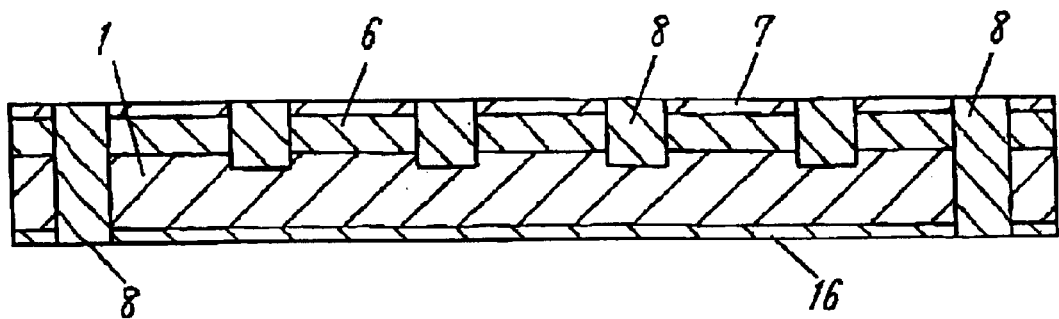
FIG. 21 is a sectional view of the solid electrolytic capacitor of embodiment 2.
Figure 22:
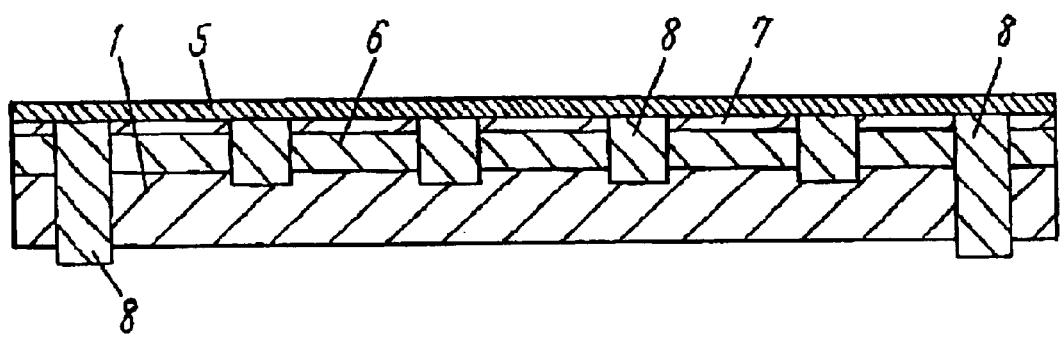
FIG. 22 is a sectional view of the solid electrolytic capacitor of embodiment 2.

Then, as shown in FIG. 21, the collector layer 7 is formed on the solid electrolyte layer 14, and a protective layer 5 is formed on the collector layer 7, as shown in FIG. 22. Then, the resist 16 is removed.

Figure 23:
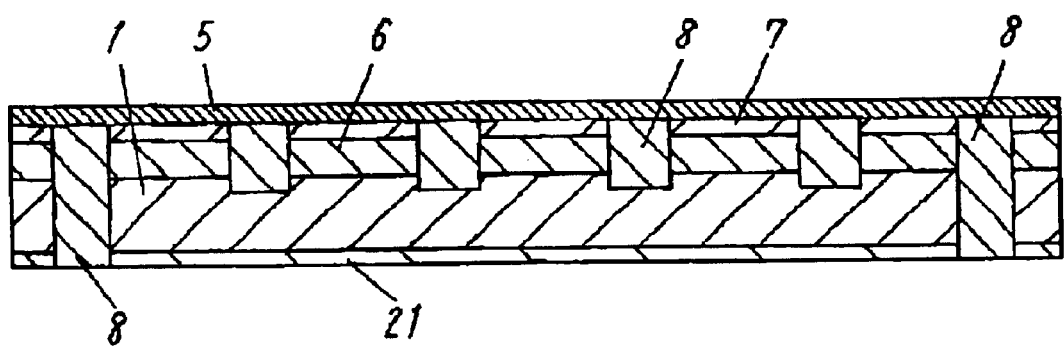
FIG. 23 is a sectional view of the solid electrolytic capacitor of embodiment 2.

As shown in FIG. 23, the other side of the valve metal sheet 1 is plated to form a lower electrode 21.

Figure 24:
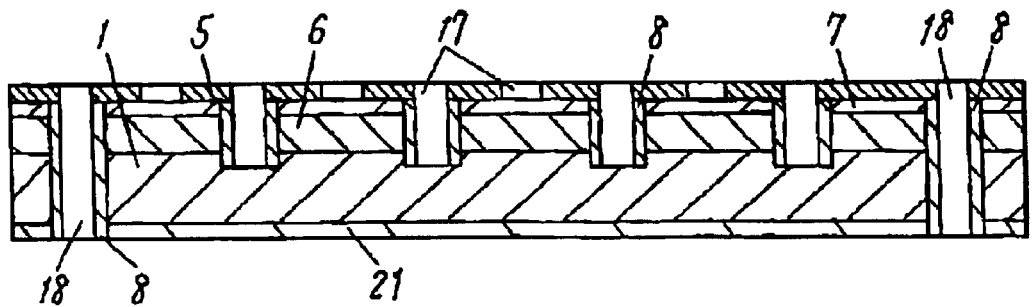
FIG. 24 is a sectional view of the solid electrolytic capacitor of embodiment 2.

As shown in FIG. 24, portions of the protective layer 5 for forming the electrode terminals 4 and the via electrode 20 and portions of the insulating portions 8 for forming the penetration electrodes 9 are removed by laser processing method or the like, to provide openings 17 and penetration portions 18.

Figure 25:
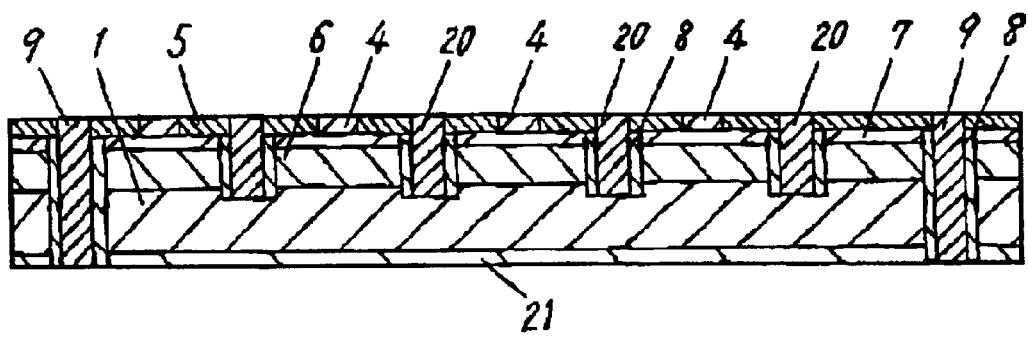
FIG. 25 is a sectional view of the solid electrolytic capacitor of embodiment 2.
Figure 26:
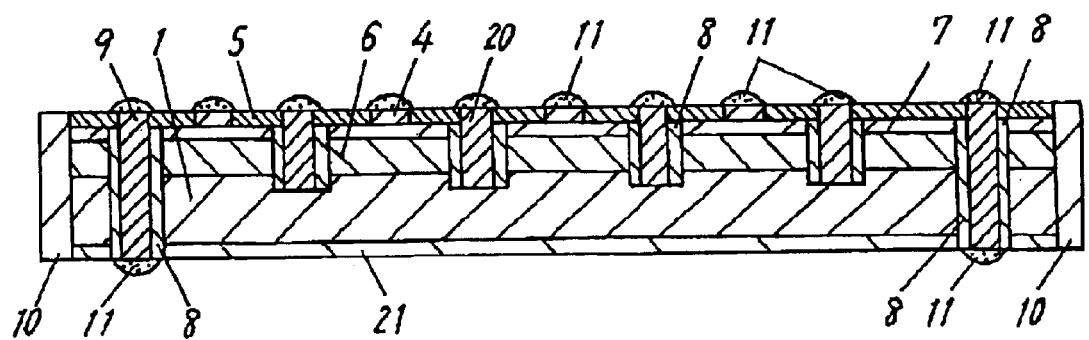
FIG. 26 is a sectional view of the solid electrolytic capacitor of embodiment 2.

Then, as shown in FIG. 25, the openings 17 and penetration portions 18 are filled with electrode terminals 4, via electrodes 20, and penetration electrodes 9 by Cu-plating. Finally, as shown in FIG. 26, the outer side surface of the valve metal sheet 1 is covered with insulating material, such as resin, to form a package 10, and connection bumps 11 are formed on exposed surfaces of the electrode terminals 4, the via electrodes 20, and the penetration electrodes 9, respectively, thus providing the solid electrolytic capacitor.

In the solid electrolytic capacitor of embodiment 2, a portion of the valve metal sheet 1 to be insulated is only the porous portion 6. Therefore, the capacitor of embodiment 1 has high reliability in electric insulation, and can be manufactured by simple processes at a high productivity in addition to effects of embodiment 1.

Further, the manufacturing method of embodiment 2 easily provides solid electrolytic capacitors applicable to semiconductor devices 12 having various numbers of terminals and various pitches of the terminals.

(Embodiment 3)

Figure 27:
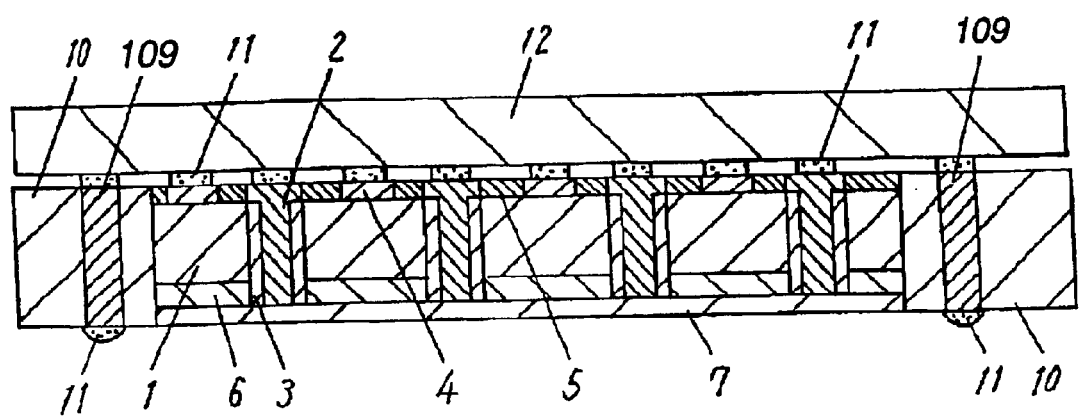
FIG. 27 is a sectional view of a solid electrolytic capacitor according to exemplary embodiment 3 of the invention.
Figure 28:
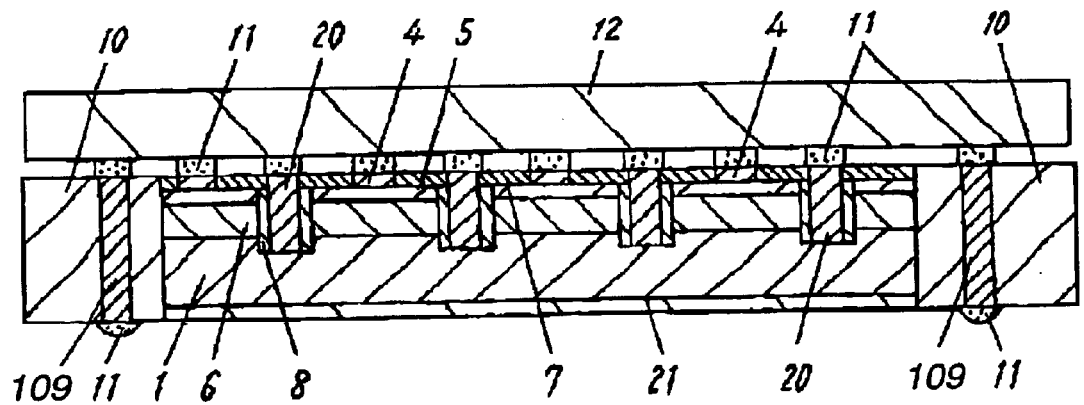
FIG. 28 is a sectional view of the solid electrolytic capacitor of embodiment 3.
Figure 29:
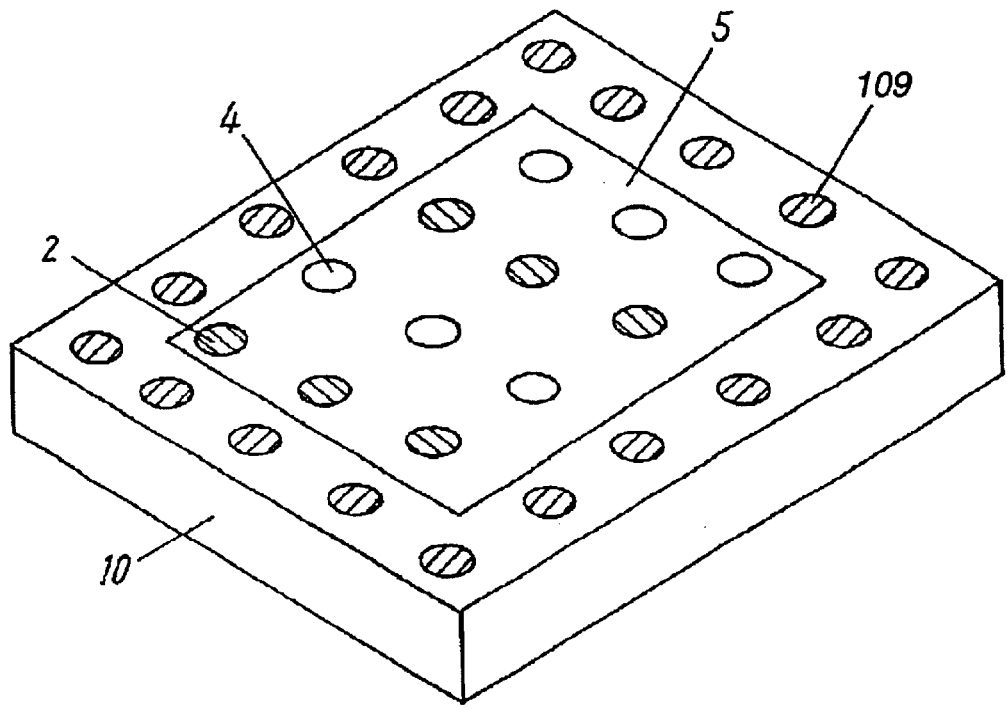
FIG. 29 is a perspective view of the solid electrolytic capacitor of embodiment 3.
Figure 30:
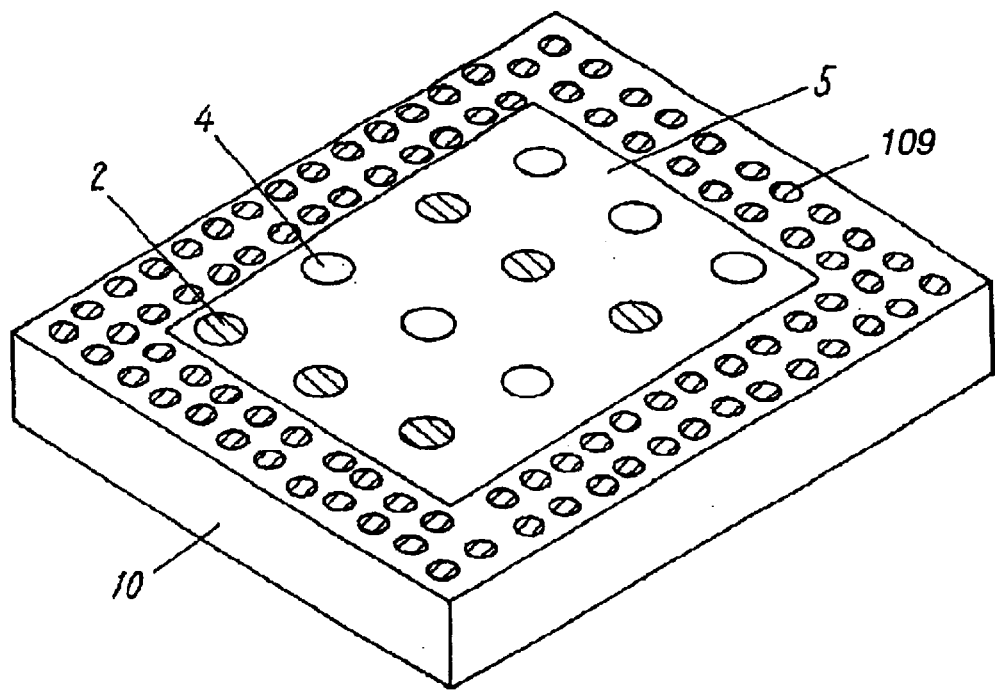
FIG. 30 is a perspective view of the solid electrolytic capacitor of embodiment 3.

FIG. 27 and FIG. 28 are sectional views of a solid electrolytic capacitor according to exemplary embodiment 3 of the invention. FIG. 29 and FIG. 30 are perspective views of the capacitor.

The capacitor shown in FIG. 27 has a structure substantially identical to that of a capacitor of embodiment 1 shown in FIG. 1, except that penetration electrodes 109 are formed in a package 10 differently from embodiment 1. The capacitor shown in FIG. 28 has a structure substantially identical to that of a capacitor of embodiment 2 shown in FIG. 17, except that penetration electrodes 109 are formed in a package 10 differently from embodiment 2.

The solid electrolytic capacitor of embodiment 3 may be manufactured similarly to embodiments 1 and 2 except that penetration holes 15 are formed in the package 10 after the package 10 is formed. The penetration electrodes 109 are formed by plating process or the like.

In the solid electrolytic capacitors of embodiment 3, locations of the penetration electrodes 109 are limited to be in the package 10 at an outer circumference of the capacitor.

However, the penetration electrodes 109 are completely insulated by the package 10, thus being prevented from defective insulation. Therefore, since a diameter of a penetration hole 15 can be reduced, the capacitor of embodiment 3 is preferable for a circuit requiring numbers of the penetration electrodes 109.

In FIG. 29, a row of penetration electrodes 109 are provided in the package 10, but, as shown in FIG. 30, multiple fine penetration electrodes 109 may be formed in the package 10.

Further, the manufacturing method of embodiment 3 easily provides solid electrolytic capacitors applicable to semiconductor devices 12 having various numbers of terminals and pitches of the terminals.

(Embodiment 4)

Figure 31:
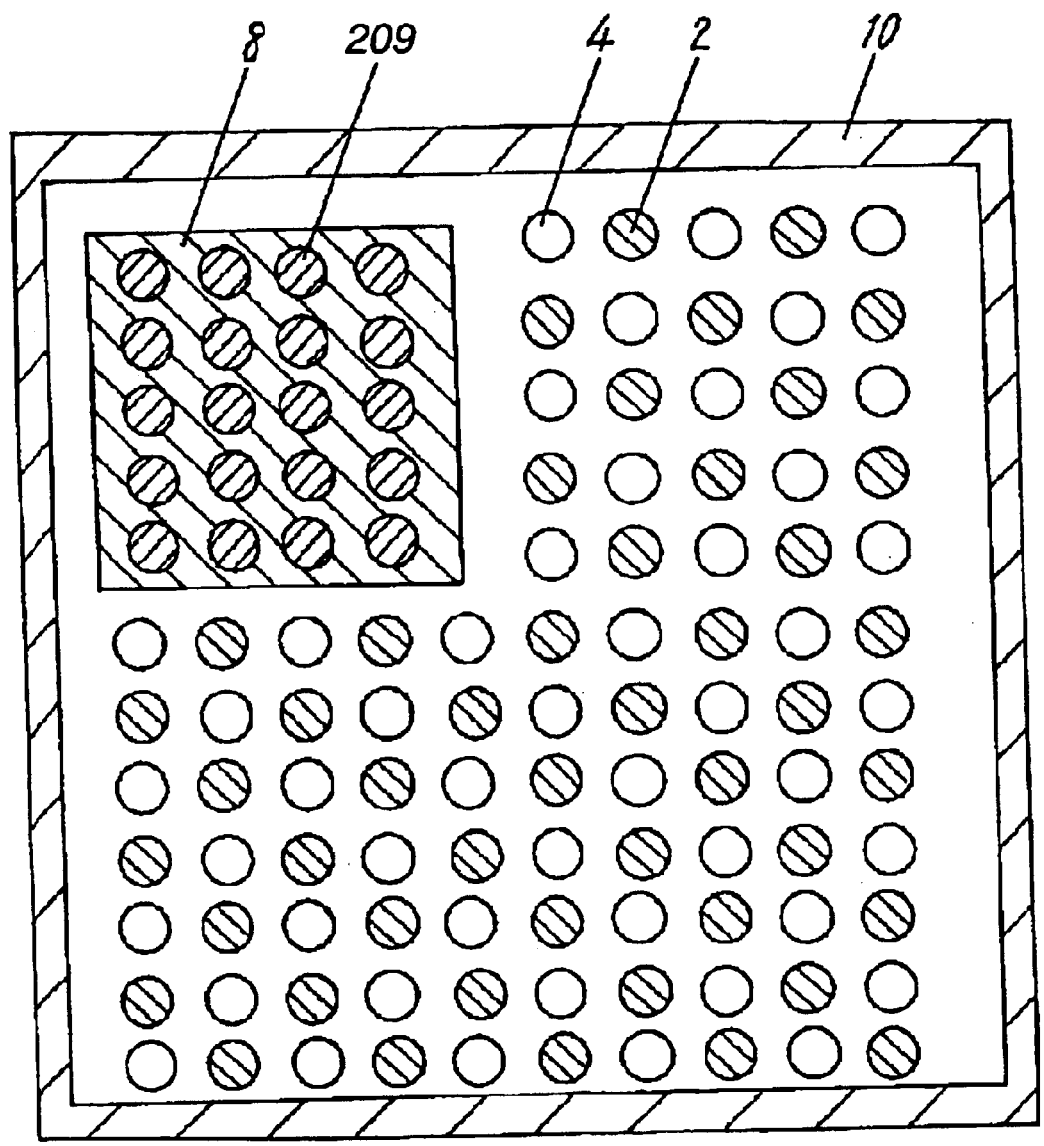
FIG. 31 is a plan view showing layout of electrodes of a solid electrolytic capacitor according to exemplary embodiment 4 of the invention.
Figure 32:
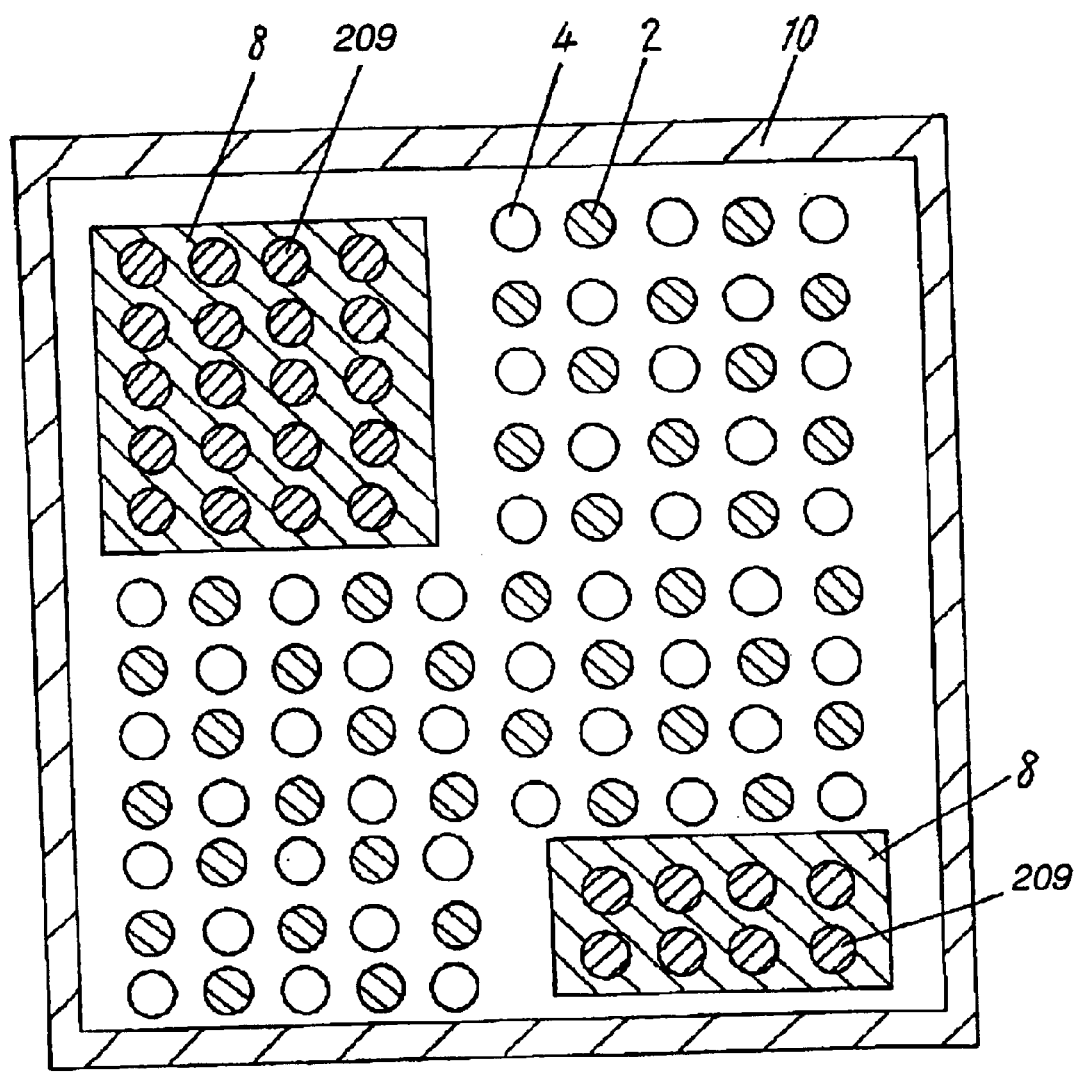
FIG. 32 is a plan view of the solid electrolytic capacitor of embodiment 4.

FIG. 31 and FIG. 32 are plan views of a solid electrolytic capacitor according to exemplary embodiment 4 of the invention. The capacitor has a structure substantially identical to that of a solid electrolytic capacitor of embodiment 1 shown in FIG. 1 or a solid electrolytic capacitor of embodiment 2 shown in FIG. 17, except that insulating portions 8 having a wide area are formed, differently from embodiments 1 and 2, and plural penetration electrodes 209 are formed in the insulating portions 8.

The solid electrolytic capacitor of embodiment 4 is formed similarly to the capacitor of embodiments 1 and 2 while only the insulating portions 8 are formed in a different manner. First, positions for providing the insulating portions 8 in the valve metal sheet 1 are penetrated, and are filled with insulating material, such as resin, thus providing the insulating portions 8 having the wide area. Then, the penetration holes 15 are formed in the insulating portions 8 conforming to terminals of a semiconductor device 12 to be used, and penetration electrodes 209 are formed by plating process.

According to embodiment 4, since the penetration electrodes 209 are formed in the insulating portions 8 having the completely-insulated wide area at arbitrary positions of the solid electrolytic capacitor, the electrodes 209 can be prevented from insulation failure. Therefore, since diameters of the penetration holes 15 can be reduced, the capacitor of embodiment 4 is preferable for a circuit requiring a number of the penetration electrodes 9. Regarding the positions of the penetration electrodes 209 of the capacitor shown in FIG. 31 and FIG. 32, the insulating portions 8 can be provided at necessary positions according to requirement, and the penetration electrodes 209 can be formed in the insulating portions 8.

(Embodiment 5)

FIG. 33 to FIG. 36 are plan views showing layout of electrodes of a solid electrolytic capacitor according to exemplary embodiment 5 of the invention. The capacitor shown in FIG. 33 and FIG. 35 has a structure identical to that of a capacitor of embodiment 1.

Figure 33:
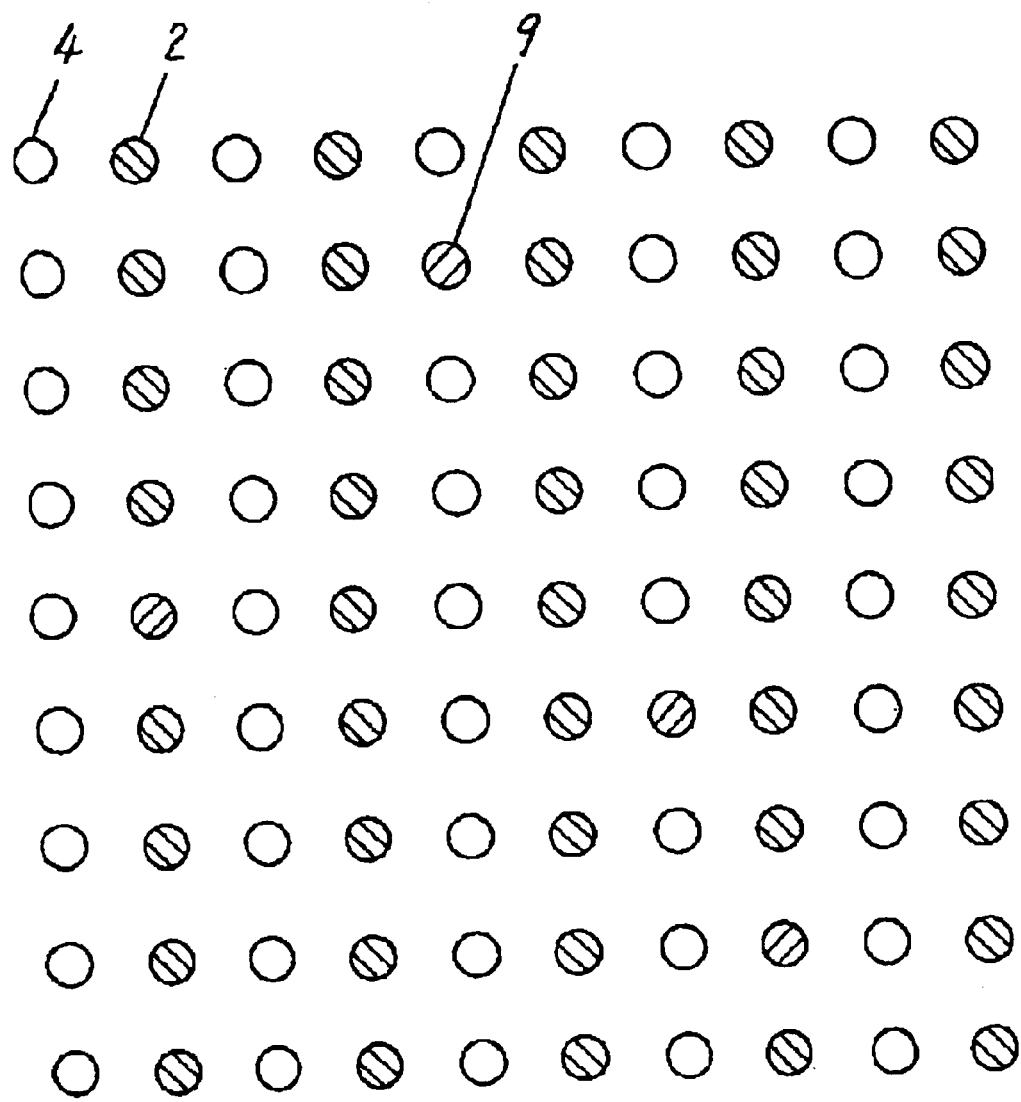
FIG. 33 is a plan view showing a layout of electrodes of a solid electrolytic capacitor according to exemplary embodiment 5 of the invention.

In the capacitor shown in FIG. 33, through-hole electrodes 2 and electrode terminals 4 are arranged in a matrix alternately in a vertical or lateral direction, and some of the through-hole electrodes 2 and the electrode terminals 4 are replaced by penetration electrodes 9.

Figure 35:
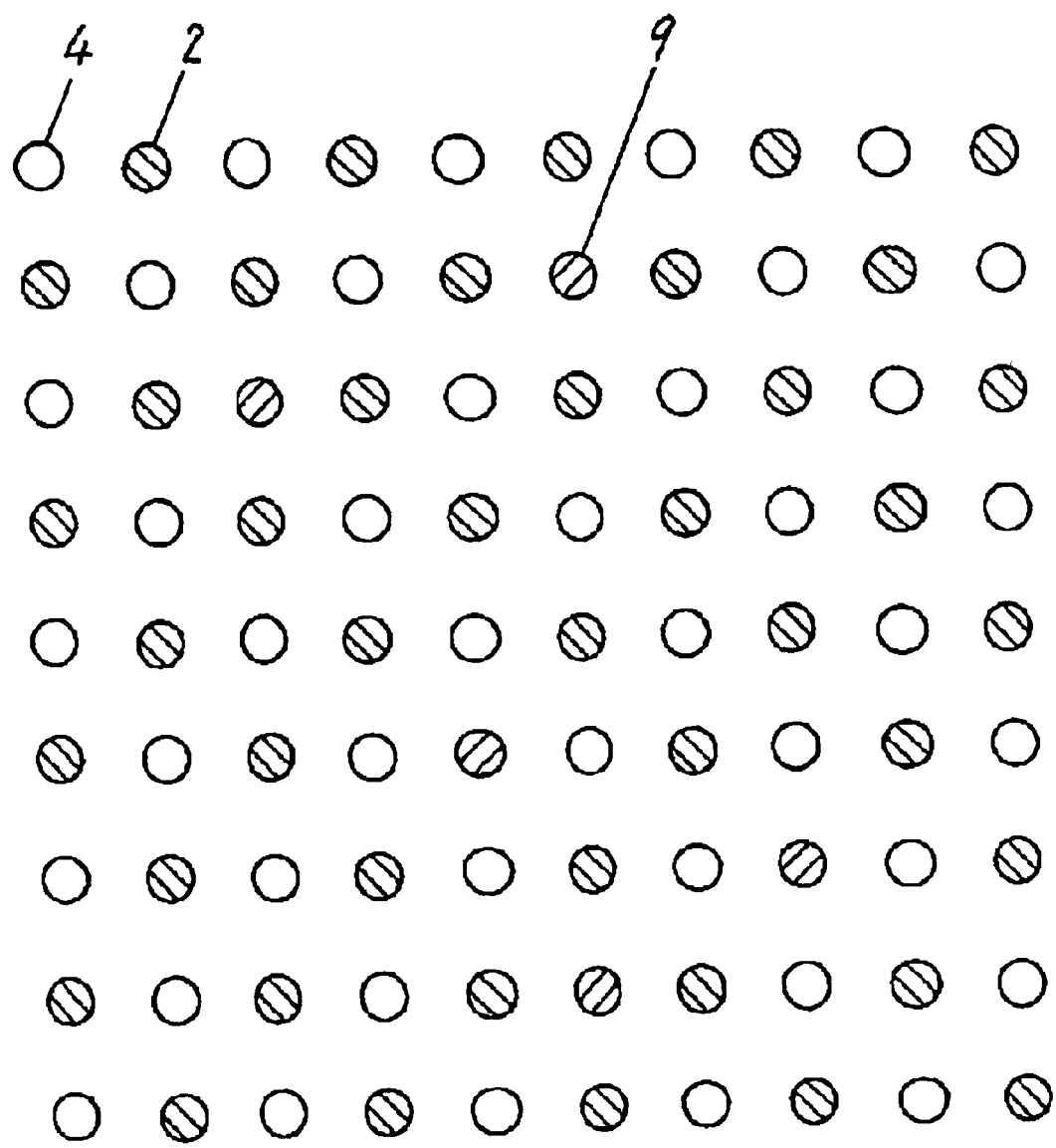
FIG. 35 is a plan view of the solid electrolytic capacitor of embodiment 5.

In the capacitor shown in FIG. 35, the through-hole electrodes 2 and the electrode terminals 4 are arranged in a matrix alternately in two, vertical and lateral directions, and some of the through-hole electrodes 2 and the electrode terminals 4 are replaced by the penetration electrodes 9.

Figure 34:
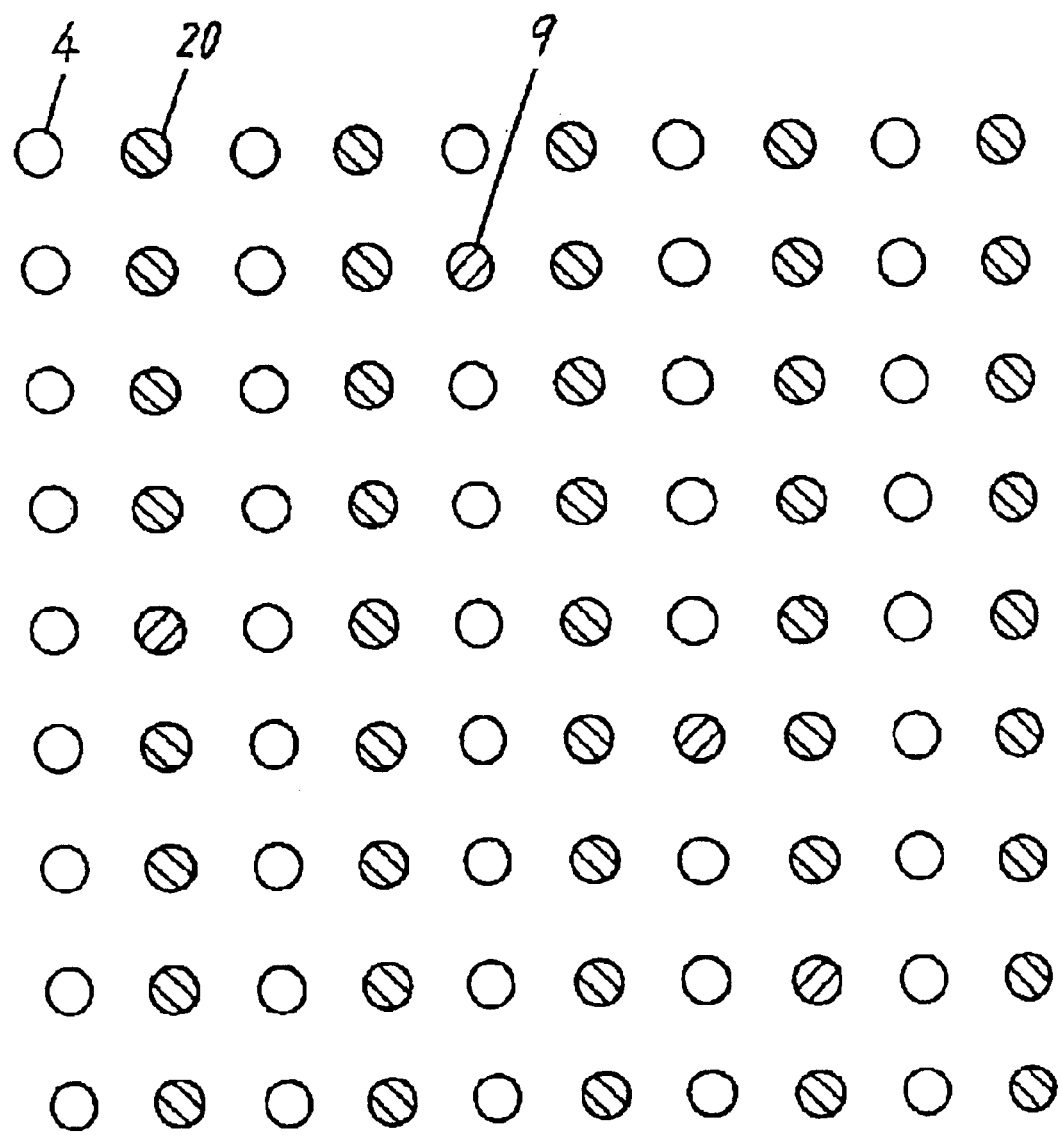
FIG. 34 is a plan view of the solid electrolytic capacitor of embodiment 5.
Figure 36:
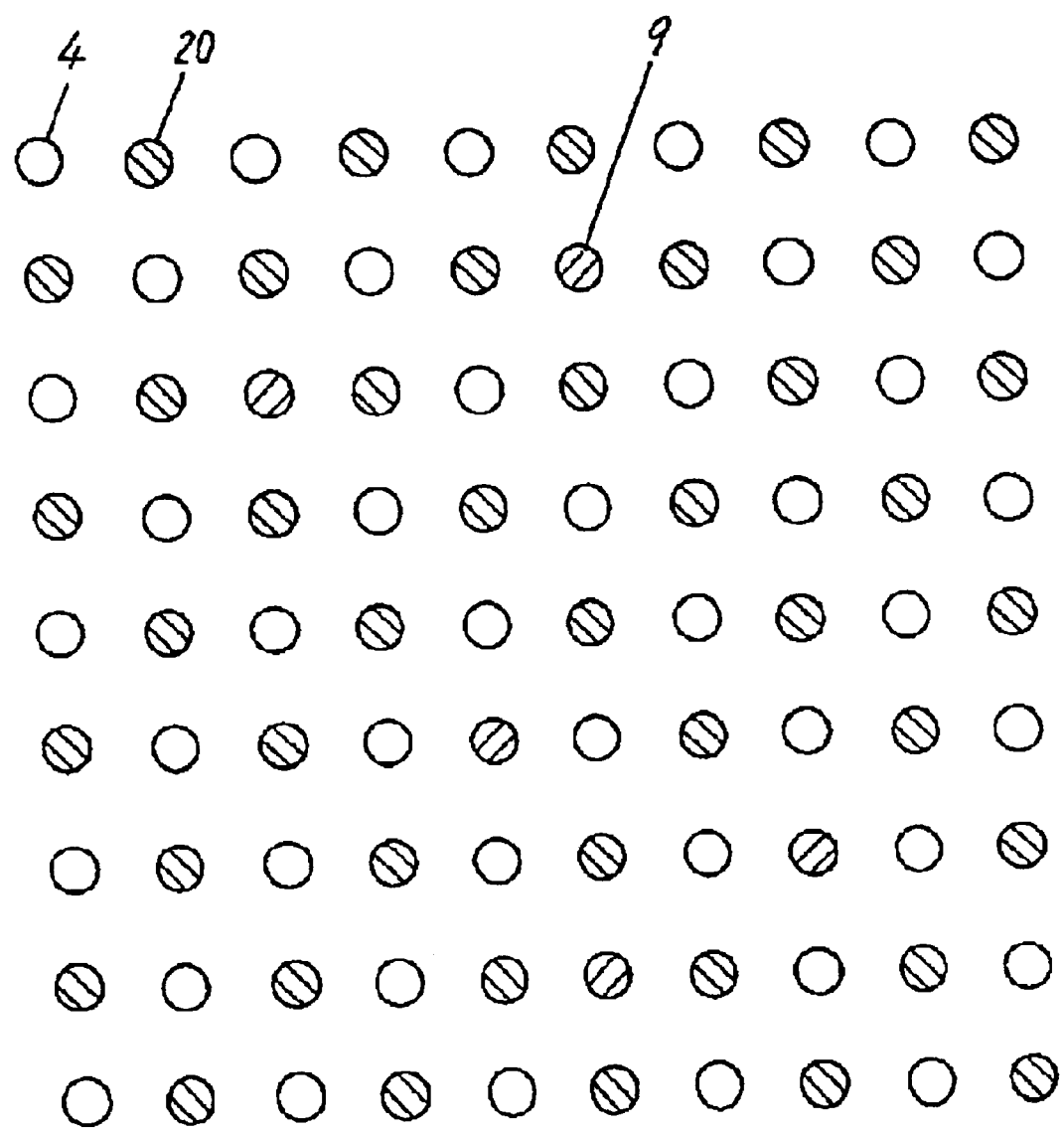
FIG. 36 is a plan view of the solid electrolytic capacitor of embodiment 5.

The solid electrolytic capacitor shown in FIG. 34 and FIG. 36 has a structure identical to that of a solid electrolytic capacitor of embodiment 2.

In the capacitor shown in FIG. 34, via electrodes 20 and electrode terminals 4 are arranged in a matrix alternately in a vertical or lateral direction, and some of the via electrodes 20 and the electrode terminals 4 are replaced by penetration electrodes 9.

In the capacitor shown in FIG. 36, the via electrodes 20 and the electrode terminals 4 are arranged in a matrix alternately in two, vertical and lateral directions, and some of the via electrodes 20 and the electrode terminals 4 are replaced by the penetration electrodes 9.

According to the above arrangement of the electrodes, the through-hole electrodes 2 or via electrodes 20 and electrode terminals 4 are arranged uniformly and alternately within a plane of the solid electrolytic capacitor. The arrangement allows currents to flow in the electrodes in directions opposite to each other. Therefore, magnetic fields generated by the currents are canceled by each other efficiently. Further, since the penetration electrodes 9 are formed at arbitrary positions of the through-hole electrodes 2 or via electrodes 20 and electrode terminals 4, the capacitor is strongly coupled to terminals of a semiconductor device 12.

(Embodiment 6)

Figure 37:
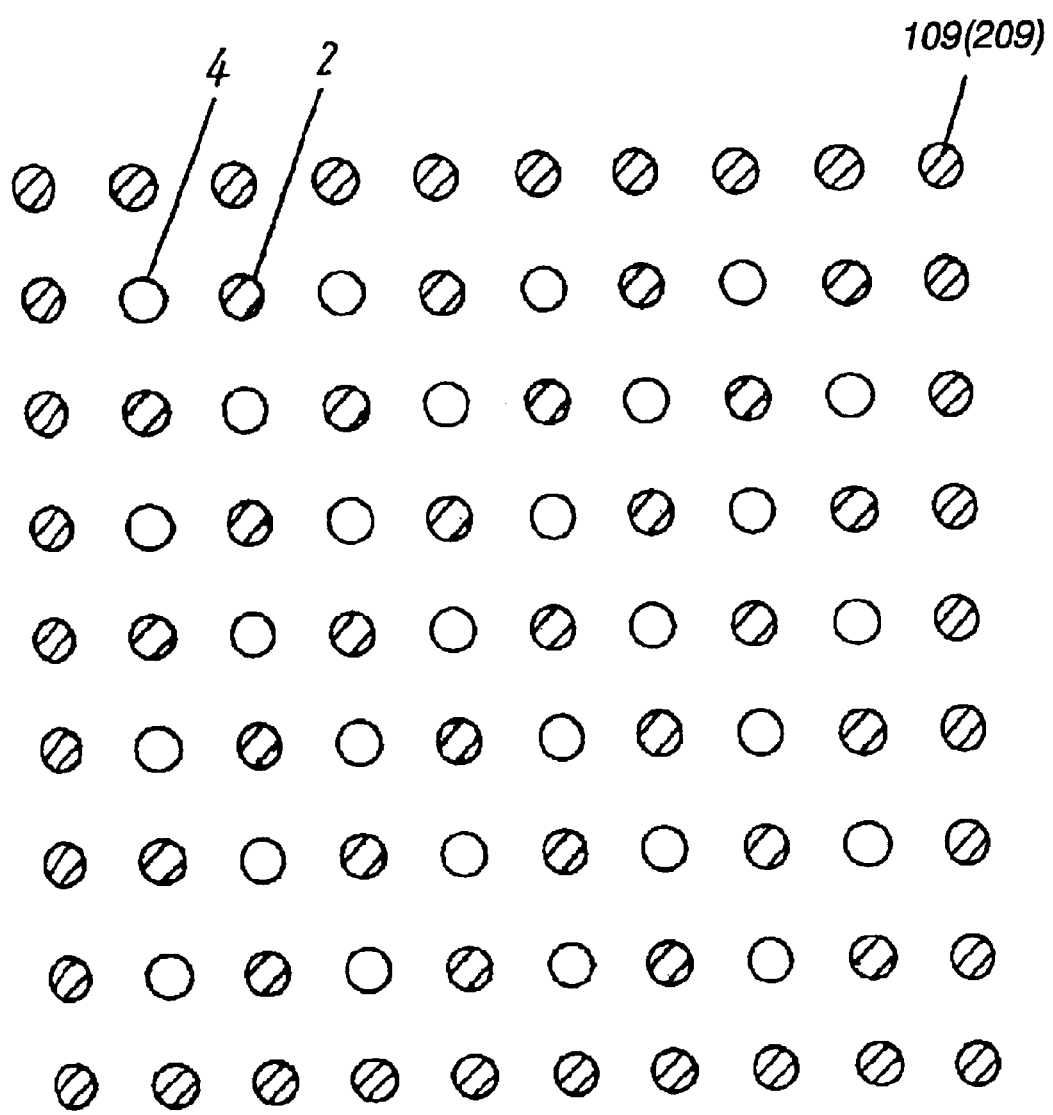
FIG. 37 is a plan view showing a layout of electrodes of a solid electrolytic capacitor according to exemplary embodiment 6 of the invention.
Figure 38:
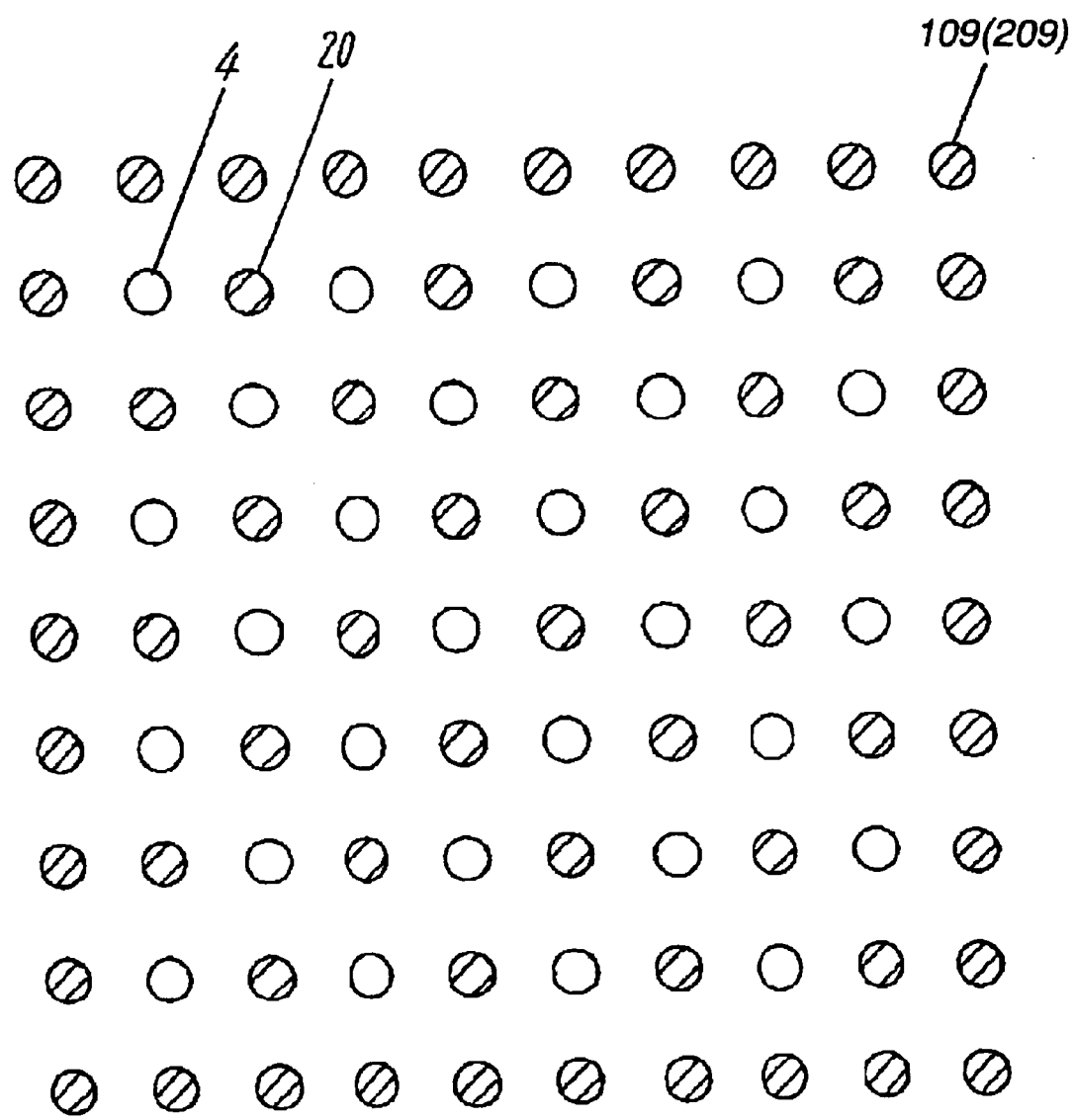
FIG. 38 is a plan view of the solid electrolytic capacitor of embodiment 6.

FIG. 37 and FIG. 38 are plan views showing an arrangement of electrodes of a solid electrolytic capacitor according to exemplary embodiment 6 of the invention. The solid electrolytic capacitor has a structure identical to that of a solid electrolytic capacitor of embodiment 1 shown in FIG. 1, or of a solid electrolytic capacitor of embodiment 2 shown in FIG. 17.

In the capacitor shown in FIG. 37, through-hole electrodes 2 and electrode terminals 4 are arranged in a matrix alternately in two, vertical and lateral directions, and penetration electrodes 109 (209) are provided in on the outer circumference of the capacitor. In the capacitor shown in FIG. 38, via electrodes 20 and electrode terminals 4 are arranged in a matrix alternately in two, vertical and lateral directions, and penetration electrodes 109 (209) are provided in the outer circumference of the capacitor.

The penetration electrodes 109 (209) are provided in the outer circumference of the capacitor. The electrodes allows magnetic fields generated by currents flowing in the electrodes between the through-hole electrodes 2 or via electrodes 20 and electrode terminals 4 to be canceled substantially without influences of the penetration electrodes 109 (209). Further, the penetration electrodes 109 (209) are provided in the outer circumference, thus providing a solid electrolytic capacitor having a large capacitance.

Thus, the solid electrolytic capacitors according to embodiments 1 to 6 are applicable to various semiconductor devices, and include the electrodes described in above, thus having an excellent radio frequency response, a small area, and a large capacitance.

What is claimed is:

1. A solid electrolytic capacitor comprising:
   a valve metal sheet having a porous portion at a first side thereof;
   a dielectric layer formed on said porous portion;
   a solid electrolyte layer formed on said dielectric layer;
   a collector layer formed on said solid electrolyte layer;
   a through-hole electrode penetrating said valve metal sheet and being exposed to a direction of a second side of said valve metal sheet, said through-hole electrode being connected to said collector layer and being insulated from said valve metal sheet;
   an electrode terminal exposed to said direction of said second side of said valve metal sheet, said electrode terminal being insulated from said through-hole electrode and connected to said valve metal sheet;

an insulating portion penetrating a portion of said valve metal sheet where said dielectric layer, said solid electrolyte layer, and said collector layer are not provided; and a penetration electrode penetrating said insulating portion.

2. The solid electrolytic capacitor of claim 1, wherein said penetration electrode is one of a plurality of penetration electrodes.

3. The solid electrolytic capacitor of claim 1, wherein said through-hole electrode is one of a plurality of through-hole electrodes.

4. The solid electrolytic capacitor of claim 1, wherein said electrode terminal is one of a plurality of electrode terminals.

5. The solid electrolytic capacitor of claim 4, wherein said through-hole electrode is one of a plurality of through-hole electrodes.

6. The solid electrolytic capacitor of claim 5, wherein said plurality of though-hole electrodes and said plurality of electrode terminals are arranged in parallel to each other and adjacently to each other.

7. The solid electrolytic capacitor of claim 6, wherein said plurality of through-hole electrodes and said plurality of electrode terminals are arranged alternately.

8. The solid electrolytic capacitor of claim 7, wherein said through-hole electrode is positioned in a middle of a certain through-hole electrode of said plurality of through-hole electrodes and a certain electrode terminal of said plurality of electrode terminals, said certain through-hole electrode hole and said certain electrode terminal being adjacent to each other.

9. The solid electrolytic capacitor of claim 7, wherein one of said plurality of through-hole electrodes and said plurality of electrode terminals is replaced by said penetration electrode.

10. The solid electrolytic capacitor of claim 6, wherein one of said plurality of through-hole electrodes and said plurality of electrode terminals is replaced by said penetration electrode.

11. The solid electrolytic capacitor of claim 1, wherein said penetration electrode is provided at an outer circumference area of said through-hole electrode and said electrode terminal.

12. The solid electrolytic capacitor of claim 1, further comprising a bump formed on at least one of respective exposed surfaces of said through-hole electrode, said electrode terminal, and said penetration electrode.

13. The solid electrolytic capacitor of claim 1, wherein said valve metal sheet comprises one of Al, Ta, and Nb.

14. The solid electrolytic capacitor of claim 1, wherein said insulating portion comprises organic insulating resin.

15. The solid electrolytic capacitor of claim 1, wherein said penetration electrode contains copper.

16. A solid electrolytic capacitor comprising:
a valve metal sheet having a porous portion at a first side thereof;
a dielectric layer formed on said porous portion;
a solid electrolyte layer formed on said dielectric layer;
a collector layer formed on said solid electrolyte layer;
a via electrode connected to a portion of said valve metal sheet where said porous portion and said collector layer are not provided, said via electrode being exposed to a direction of said first side of said valve metal sheet;
an electrode terminal exposed to said direction of said first side of said valve metal sheet, said electrode terminal being insulated from said via electrode and connected to said collector layer;

an insulating portion penetrating a portion of said valve metal sheet where said dielectric layer, said solid electrolyte layer, and said collector layer are not formed; and a penetration electrode penetrating said insulating portion.

17. The solid electrolytic capacitor of claim 16, wherein said penetration electrode is one of a plurality of penetration electrodes.

18. The solid electrolytic capacitor of claim 16, wherein said via electrode is one of a plurality of via electrodes.

19. The solid electrolytic capacitor of claim 16, wherein said electrode terminal is one of a plurality of electrode terminals.

20. The solid electrolytic capacitor of claim 19, wherein said via electrode is one of a plurality of via electrodes.

21. The solid electrolytic capacitor of claim 20, wherein said plurality of via electrodes and said plurality of electrode terminals are arranged in parallel to each other and adjacently to each other.

22. The solid electrolytic capacitor of claim 21, wherein said plurality of via electrodes and said plurality of electrode terminals are arranged alternately.

23. The solid electrolytic capacitor of claim 22, wherein said penetration electrode is positioned in a middle of a certain via electrode of said plurality of via electrodes and a certain electrode terminal of said plurality of electrode terminals, and said certain via electrode and said certain electrode terminal are adjacent to each other.

24. The solid electrolytic capacitor of claim 22, wherein one of said plurality of via electrodes and said plurality of electrode terminals is replaced by said penetration electrode.

25. The solid electrolytic capacitor of claim 21, wherein one of said plurality of via electrodes and said plurality of electrode terminals is replaced by said penetration electrode.

26. The solid electrolytic capacitor of claim 16, wherein said penetration electrode is provided at an outer circumference area of said via electrode and said electrode terminal.

27. The solid electrolytic capacitor of claim 16, further comprising a bump formed on at least one of respective exposed surfaces of said via electrode, said electrode terminal, and said penetration electrode.

28. The solid electrolytic capacitor of claim 16, wherein said valve metal sheet comprises one of Al, Ta, and Nb.

29. The solid electrolytic capacitor of claim 16, wherein said insulating portion comprises organic insulating resin.

30. The solid electrolytic capacitor of claim 16, wherein said penetration electrode contains copper.

31. A solid electrolytic capacitor comprising:
a valve metal sheet having a porous portion on a first side thereof;
a dielectric layer formed on said porous portion;
a solid electrolyte layer formed on said dielectric layer;
a collector layer formed on said solid electrolyte layer;
a through-hole electrode penetrating said valve metal sheet and exposed to a direction of a second side of said valve metal sheet, said through-hole electrode being connected to said collector layer and insulated from said valve metal sheet;
an electrode terminal exposed to a direction of said second side of said valve metal sheet, said electrode terminal being insulated from said through-hole electrode and connected to said valve metal sheet;
a package covering a side surface of said valve metal sheet; and
a penetration electrode penetrating said package in a direction from said first side to said second side of said valve metal sheet.

32. The solid electrolytic capacitor of claim 31, further comprising a bump formed on at least one of respective exposed surfaces of said through-hole electrode, said electrode terminal, and said penetration electrode.

33. The solid electrolytic capacitor of claim 31, wherein said valve metal sheet comprises one of Al, Ta, and Nb.

34. The solid electrolytic capacitor of claim 31, wherein said insulating portion comprises organic insulating resin.

35. The solid electrolytic capacitor of claim 31, wherein said penetration electrode contains copper.

36. A solid electrolytic capacitor comprising:
a valve metal sheet having a porous portion at a first side thereof;
a dielectric layer formed on said porous portion;
a solid electrolyte layer formed on said dielectric layer;
a collector layer formed on said solid electrolyte layer;
a via electrode exposed to a direction of said first side of said valve metal sheet, said via electrode being connected to a portion of said valve metal sheet where said porous portion and said collector layer are not provided;
an electrode terminal exposed to said direction of said first side of said valve metal sheet, said electrode terminal being insulated from said via electrode and connected to said collector layer;
a package covering a side surface of said valve metal sheet; and
a penetration electrode penetrating said package in a direction from said first side to said second side of said valve metal sheet.

37. The solid electrolytic capacitor of claim 36, further comprising a bump formed on at least one of respective exposed surfaces of said via electrode, said electrode terminal, and said penetration electrode.

38. The solid electrolytic capacitor of claim 36, wherein said valve metal sheet comprises one of Al, Ta, and Nb.

39. The solid electrolytic capacitor of claim 36, wherein said insulating portion comprises organic insulating resin.

40. The solid electrolytic capacitor of claim 36, wherein said penetration electrode contains copper.

41. A method of manufacturing a solid electrolytic capacitor, comprising the steps of:
forming first and second penetration holes in a valve metal sheet;
forming a dielectric layer on a first side of the valve metal sheet;
forming a solid electrolyte layer on the dielectric layer;
forming a collector layer on the dielectric layer;
forming a through-hole electrode exposed to a second side of the valve metal sheet in the first penetration hole, the through-hole electrode being connected to the collector layer;
forming an electrode terminal exposed to the second side of the valve metal sheet the electrode terminal being connected to the valve metal sheet;
forming an insulating portion by filling the second penetration hole with insulating material; and
forming a penetration electrode penetrating the insulating portion.

42. The method of claim 41, wherein said step of forming the electrode terminal includes the sub-step of forming the electrode terminal by plating.

43. The method of claim 41, wherein said step of forming the penetration electrode includes the sub-steps of
forming a third penetration hole in the insulating portion, and
forming the penetration electrode in the third penetration hole by plating.

44. A method of manufacturing a solid electrolytic capacitor, comprising:
forming a blind hole in a first side of a valve metal sheet;
forming a penetration hole in the valve metal sheet;
forming a dielectric layer on the first side of the valve metal sheet;
forming a solid electrolyte layer on the dielectric layer;
forming a collector layer on the dielectric layer;
forming a first insulating portion by filling the blind hole with insulating material;
forming a second insulating portion by filling the penetration hole of the valve metal sheet with insulating material;
forming an electrode terminal exposed in a direction of the first side of the valve metal sheet and connected to the valve metal sheet;
forming a via electrode exposed in the direction of the first side of the valve metal sheet in the first insulating portion and connected to the collector layer; and
forming a penetration electrode penetrating the second insulating portion.

45. The method of claim 44, wherein said step of forming the electrode terminal includes the sub-step of forming the electrode terminal by plating.

46. The method of claim 44, wherein said step of forming the via electrode includes the sub-steps of
forming a hole in the first insulating portion, the hole reaching a bottom of the blind hole, and
forming the via electrode in the hole of the first insulating portion by plating.

47. The method of claim 44, wherein said step of forming the penetration electrode includes the sub-steps of
forming a penetration hole in the second insulating portion, and
forming the penetration electrode in the penetration hole of the second insulating portion by plating.

48. A method of manufacturing a solid electrolytic capacitor, comprising the steps of:
forming a dielectric layer on a first side of a valve metal sheet;
forming a solid electrolyte layer on the dielectric layer;
forming a collector layer on the dielectric layer;
forming a through-hole electrode exposed to a second side of the valve metal sheet and connected to the collector layer;
forming an electrode terminal exposed to the second side of the valve metal sheet and connected to the valve metal sheet;
forming a package covering a side surface of the valve metal sheet; and
forming a penetration electrode penetrating the package.

49. The method of claim 48, wherein said step of forming the penetration electrode includes the sub-steps of
forming a penetration hole in the package, and
forming the penetration electrode in the penetration hole of the package by plating.

50. A method of manufacturing a solid electrolytic capacitor, comprising:
forming a blind hole in a first side of a valve metal sheet;

forming a dielectric layer on the first side of the valve metal sheet;

forming a solid electrolyte layer on the dielectric layer;

forming a collector layer on the solid electrolyte layer;

forming an insulating portion by filling the blind hole with insulating material;

forming an electrode terminal exposed in the direction of the first side of the valve metal sheet and connected to the valve metal sheet;

forming a via electrode in the insulating portion, the via electrode being exposed in a direction of the first side of the valve metal sheet and connected to the collector layer;

forming a package for covering a side surface of the valve metal sheet; and forming a penetration electrode penetrating the package.

51. The method of claim 50, wherein said step of forming the penetration electrode includes the sub-steps of forming penetration holes in the package, and forming the penetration electrode in the penetration hole of the package by plating.

* * * * *